US010042030B2

(12) United States Patent
Corio

(10) Patent No.: US 10,042,030 B2
(45) Date of Patent: Aug. 7, 2018

(54) TORQUE LIMITER DEVICES, SYSTEMS AND METHODS AND SOLAR TRACKERS INCORPORATING TORQUE LIMITERS

(71) Applicant: Ronald P. Corio, Los Ranchos, NM (US)

(72) Inventor: Ronald P. Corio, Los Ranchos, NM (US)

(73) Assignee: Array Technologies, Inc., Albuquerque, NM (US)

( * ) Notice: Subject to any disclaimer, the term of this patent is extended or adjusted under 35 U.S.C. 154(b) by 72 days.

(21) Appl. No.: 15/437,488

(22) Filed: Feb. 21, 2017

(65) Prior Publication Data

US 2017/0160372 A1 Jun. 8, 2017

Related U.S. Application Data

(63) Continuation of application No. 14/624,930, filed on Feb. 18, 2015, now Pat. No. 9,581,678.
(Continued)

(51) Int. Cl.
*G01S 3/786* (2006.01)
*F24S 40/00* (2018.01)
(Continued)

(52) U.S. Cl.
CPC ........... *G01S 3/7861* (2013.01); *F24S 30/425* (2018.05); *F24S 40/00* (2018.05);
(Continued)

(58) Field of Classification Search
CPC ....... G01S 3/7861; F24S 30/425; F24S 40/00; F24S 2030/115; F24S 2030/15; F24S 2030/134; F24S 2030/136; Y02E 10/47
(Continued)

(56) References Cited

U.S. PATENT DOCUMENTS

| 4,323,052 A | 4/1982 | Stark |
| 4,340,812 A | 7/1982 | Mori |

(Continued)

FOREIGN PATENT DOCUMENTS

| JP | S55-131648 A | 10/1980 |
| JP | S64-010809 U | 1/1989 |

(Continued)

OTHER PUBLICATIONS

Office Action dated Apr. 17, 2017 in related Japanese Patent Application No, 2016-550728.
(Continued)

*Primary Examiner* — Seung C Sohn
(74) *Attorney, Agent, or Firm* — Eric L. Lane; Green Patent Law

(57) ABSTRACT

A solar tracker assembly comprises a support column, a torsion beam connected to the support column, a mounting mechanism attached to the torsion beam, a drive system connected to the torsion beam, and a torsion limiter connected to an output of the drive system. When an external force causes a level of torsion on the drive system to exceed a pre-set limit the torsion limiter facilitates rotational movement of the solar tracker assembly in the direction of the torsion, thereby allowing the external force to rotate about a pivot axis extending through the torsion beam. Exemplary embodiments also include methods of aligning a plurality of rows of solar trackers.

27 Claims, 22 Drawing Sheets

Related U.S. Application Data

(60) Provisional application No. 62/065,741, filed on Oct. 19, 2014, provisional application No. 61/941,754, filed on Feb. 19, 2014.

(51) Int. Cl.
*F24S 30/425* (2018.01)
*F24S 30/00* (2018.01)

(52) U.S. Cl.
CPC .... *F24S 2030/115* (2018.05); *F24S 2030/134* (2018.05); *F24S 2030/136* (2018.05); *F24S 2030/15* (2018.05); *Y02E 10/47* (2013.01)

(58) Field of Classification Search
USPC ........................................ 250/203.4; 136/246
See application file for complete search history.

(56) References Cited

U.S. PATENT DOCUMENTS

| | | | |
|---|---|---|---|
| 4,354,484 A * | 10/1982 | Malone | F24S 50/00 126/602 |
| 4,572,161 A * | 2/1986 | Mori | F24S 30/452 126/600 |
| 4,866,918 A | 9/1989 | Engelstad et al. | |
| 5,080,642 A | 1/1992 | Takami | |
| 5,228,924 A | 7/1993 | Barker et al. | |
| 5,241,871 A | 9/1993 | McKnight et al. | |
| 5,730,014 A | 3/1998 | Berger et al. | |
| 6,280,331 B1 | 8/2001 | Tuttlebee | |
| 6,464,217 B1 | 10/2002 | Kulpa et al. | |
| 7,197,383 B2 | 3/2007 | Tobler et al. | |
| 7,850,577 B2 | 12/2010 | Warner et al. | |
| 7,934,997 B2 | 5/2011 | Avins et al. | |
| 8,372,082 B2 | 2/2013 | Click et al. | |
| 8,459,249 B2 | 6/2013 | Corio | |
| 8,697,983 B2 | 4/2014 | Cashion et al. | |
| 8,877,016 B2 | 11/2014 | Ba-Abbad et al. | |
| 9,203,343 B2 | 12/2015 | Holze | |
| 9,236,516 B2 | 1/2016 | Goldsby | |
| 2005/0284467 A1 | 12/2005 | Patterson | |
| 2006/0096586 A1 | 5/2006 | Hayden | |
| 2007/0034205 A1 | 2/2007 | Watts | |
| 2008/0128235 A1 | 6/2008 | Avins et al. | |
| 2008/0314440 A1 | 12/2008 | Clemens et al. | |
| 2009/0095283 A1 | 4/2009 | Curtis et al. | |
| 2010/0166843 A1 | 7/2010 | Bertocchi | |
| 2012/0285279 A1 | 11/2012 | Wade et al. | |
| 2013/0340807 A1 | 12/2013 | Gerwing et al. | |
| 2013/0341934 A1 | 12/2013 | Kawanishi | |
| 2014/0338659 A1 | 11/2014 | Corio | |

FOREIGN PATENT DOCUMENTS

| | | |
|---|---|---|
| JP | 2010-067716 A | 3/2010 |
| JP | 2012-204471 A | 10/2012 |
| WO | WO 2008/147560 A1 | 12/2008 |
| WO | WO 2013/139745 A2 | 9/2013 |

OTHER PUBLICATIONS

English Translation of Office Action dated Apr. 17, 2017 in related Japanese Patent Application No. 2016-550728.
Summary of Office Action dated Apr. 17, 2017 in related Japanese Patent Application No. 2016-550728.
International Search Report and Written Opinion dated May 19, 2015 in related International Application No. PCT/US2015/016290.
Extended European Search Report dated Aug. 1, 2017 in related European Patent Application No. 15751281.5.
Office Action dated Jan. 9, 2018 in related Chinese Patent Application No. 201580009424.7.

\* cited by examiner

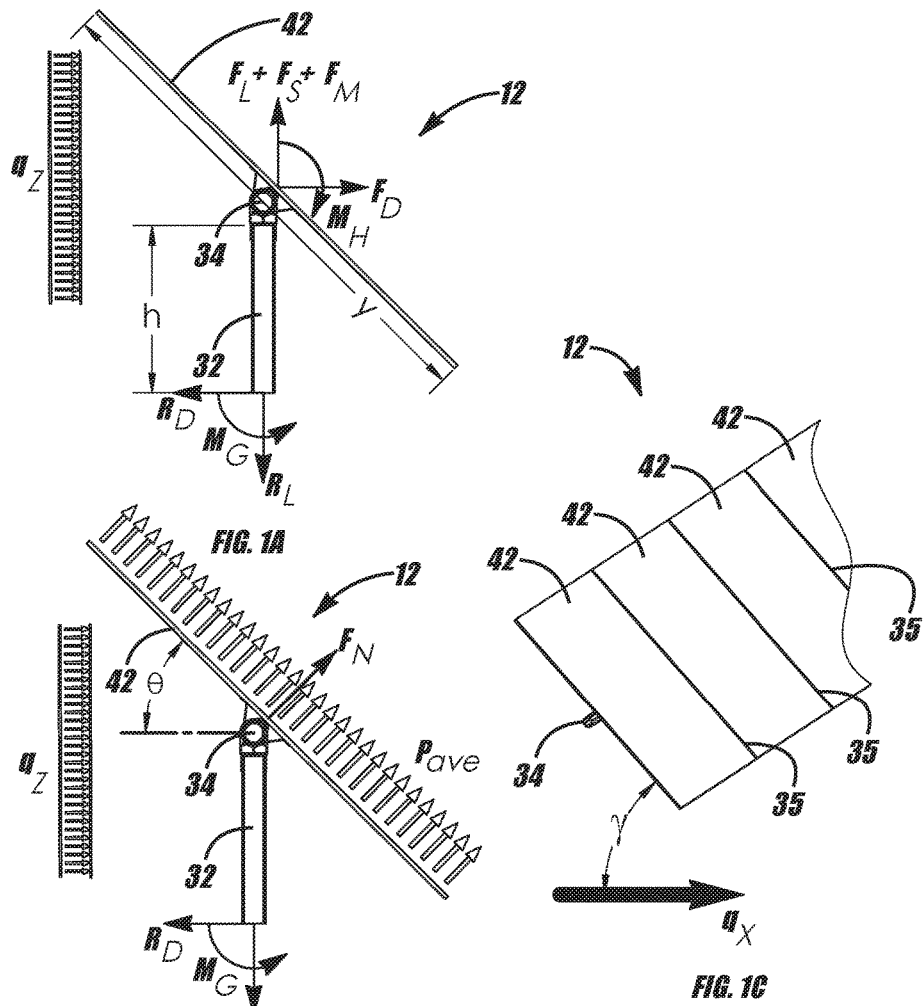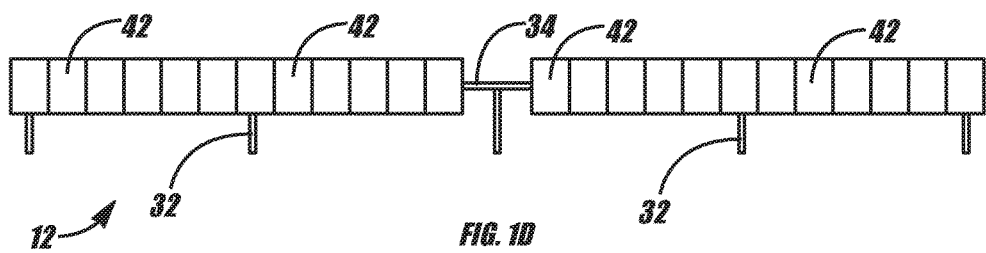

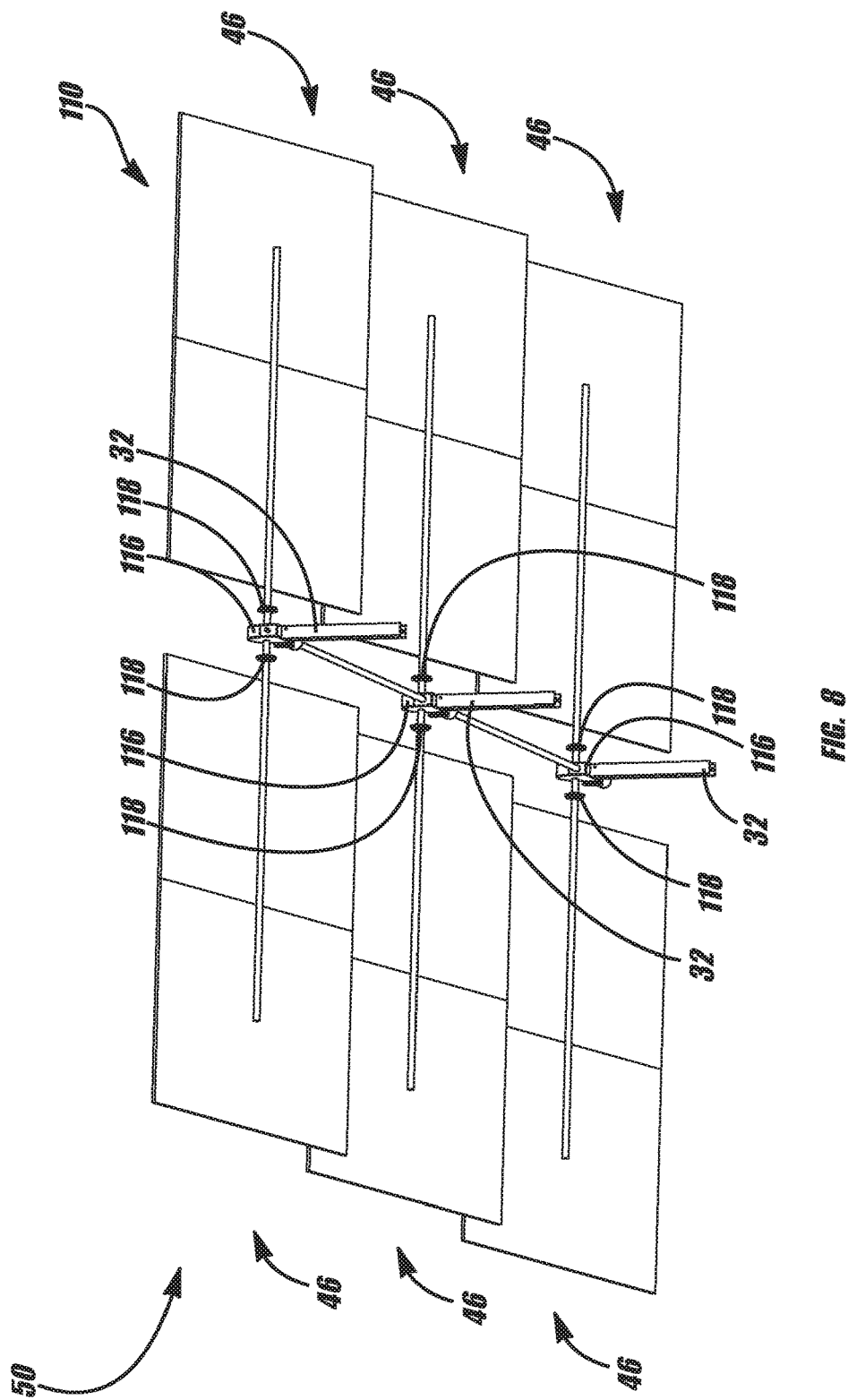

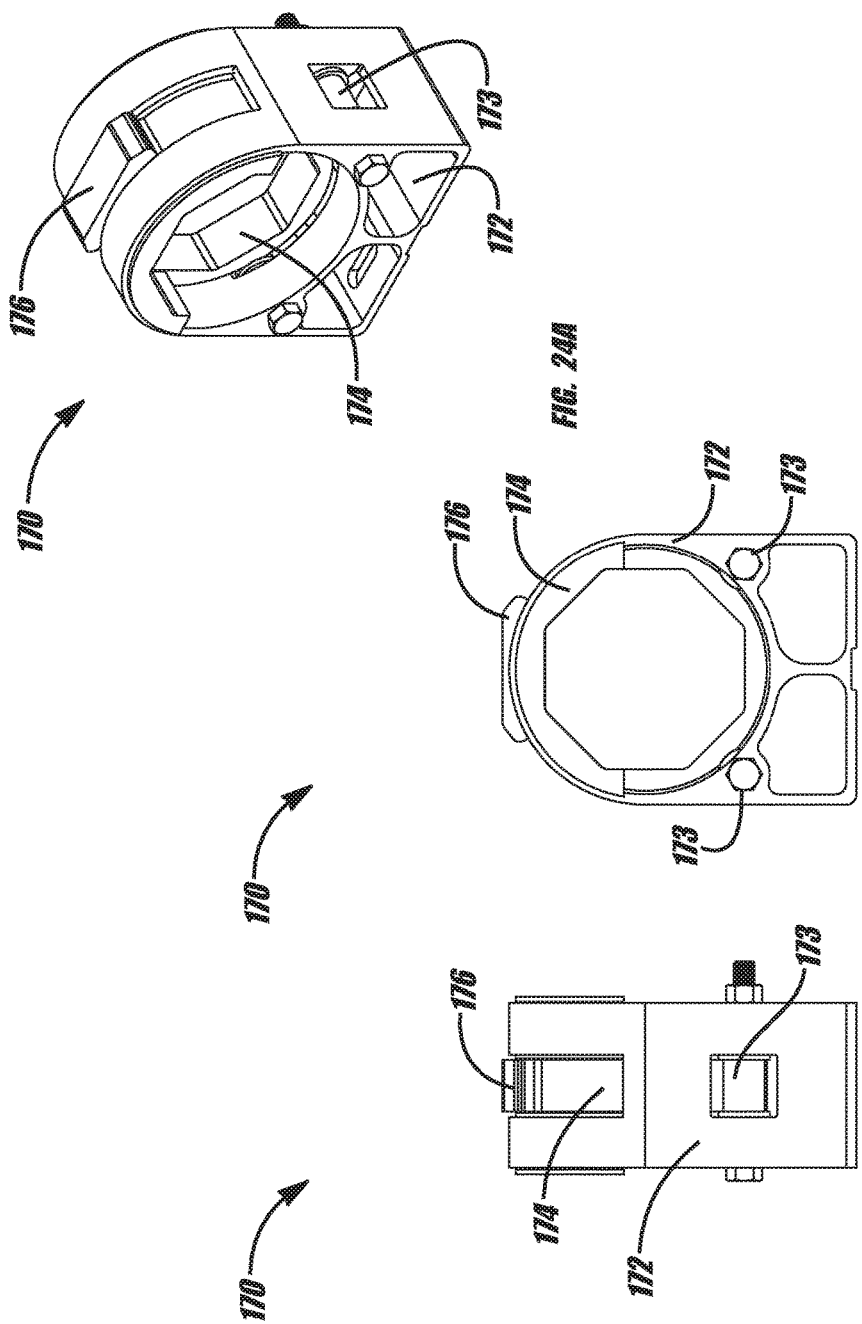

TORQUE LIMITER DEVICES, SYSTEMS AND METHODS AND SOLAR TRACKERS INCORPORATING TORQUE LIMITERS

CROSS-REFERENCE TO RELATED APPLICATIONS

This application is a continuation of and claims priority to U.S. patent application Ser. No. 14/624,930, filed Feb. 18, 2015, which is a non-provisional of and claims priority to U.S. Patent Application Ser. No. 61/941,754, filed Feb. 19, 2014, and U.S. Patent Application Ser. No. 62/065,741, filed Oct. 19, 2014, each of which is hereby incorporated by reference in its entirety.

FIELD

The present disclosure relates to torsion limiter devices, systems, and methods. The present disclosure further relates to torque release mechanisms in mechanical positioning systems. The present disclosure further relates to torque limiting and slip clutch assemblies.

BACKGROUND

As the wind acts on a solar tracking photovoltaic (PV) array or other mechanically driven positioning systems exposed to outdoor environmental forces, it causes positive and negative pressures on the array which may act independently, cumulatively, or differentially. These wind forces are commonly categorized as drag, uplift, downforce and hinge moment about the rotational axis. The wind forces vary depending upon the wind speed, direction and rotational tracking angle of the array. These forces are also usually greater on the outer structures in a large array field.

Typically, in the case of single axis solar tracking systems, the lift and drag induced on the tracked array or other mechanical system are resisted at multiple points within the structure. However, as evidenced by existing systems, the hinge moment typically is resisted at a single point. The resulting torsional forces applied to relatively long torsion tubes or other beam configurations may be large and tend to interact with the torsional flexibility of the tracker structure. Counteracting the high hinge moment forces at a single point in the structure requires sufficiently strong torsional members to resist both the high combined torque and the beam loads of the system without excess flexibility. The hinge moment forces may present as a static force or sometimes dynamic force known as torsional divergence. If the structural system of the tracker is flexible in its design, and is torsionally restrained at a single point, torsional divergence and other dynamic forces may occur that have the potential to substantially increase the loading on the structure. It is therefore structurally advantageous to minimize the flexibility of the tracker structure to reduce or eliminate the wind interactions that may cause these dynamic forces.

Accordingly, there is a need for a mechanism to reduce the peak hinge moment force that a tracking system will be exposed to and/or allow the system to resist the moment forces at multiple points, thereby minimizing or effectively eliminating the dynamic/harmonic forces the structure is exposed to. Minimizing torsion in the structure increases the beam load capability of the relevant structural members since the combination load of the torsion and beam loading is less. By limiting the peak torsion force and then providing a means to resist a lower maximum torsion force at multiple points along the structure, lighter structural components may be incorporated to lower the material weight and cost of solar tracker systems.

SUMMARY

Exemplary embodiments of the present disclosure alleviate to a great extent the disadvantages of known mechanical systems such as solar trackers by incorporating a torsion limiter, which may in some instances be a torque limiting clutch, at the output of a primary gearbox, prior to the engagement of a secondary gear rack in each tracker row. In essence, this places a pre-set torque release mechanism between the torsion stressed components and the drive in each individually motorized or linked tracker row of a tracker system. Exemplary embodiments of this disclosure advantageously minimize the wind induced torsion forces on the tracker array in order to materially reduce the structural requirements of the tracking system. Materially reducing structure may result in a considerable reduction in the cost of the tracker system.

Exemplary embodiments of a torsion limiter act as a torsional force relief valve that minimizes the hinge moments and eliminates any significant dynamic forces that may be induced by the wind on mechanical systems such as PV tracking structures. An important function is to relieve the torsion during high wind events and allow each individual tracker row to move to a different position until either the array moves to a position in which the torsion force is no longer able to overcome the preset torsion release force, or the array is moved by the torsional force to the extreme angles of rotation and is then restrained at multiple points on the structure. Incorporating multiple stops along the array at the extreme rotation positions minimizes the torsion force in any one section of the torsional resisting structural component or components.

In exemplary embodiments, the torsion limiter may also act as an overload relief from the input force of the drive motor if the array cannot move due to an obstruction such as an unbalanced heavy snow load, snow drift, or sand dune, or if one or more of the linked gear sets are at an extreme limit stop condition. In this condition the torsion limiting clutch will de-couple the input driving forces from the output forces if the obstruction resistance is greater than the torsion limiting threshold. In exemplary embodiments, the forces that will be released by the torsion limiter will be both the hinge moment forces induced externally on the array, and also from the input driving mechanism, when the input driving forces required to move the array are above the torsion limiter threshold.

Exemplary embodiments of a solar tracker assembly comprise a support column, a torsion beam connected to the support column, a mounting mechanism attached to the torsion beam, a drive system connected to the torsion beam, and a torsion limiter connected to the drive system. The solar tracker assembly may include a plurality of support columns and further comprise a stop at each support column. The torsion beam may be configured with a balanced center of gravity such that it rotates about the balanced center of gravity. When an external force such as the wind causes a level of torsion in the system to exceed a pre-set limit, the torsion limiter then facilitates rotational movement of the solar tracker assembly in the direction of the torsion, thereby allowing the external force to rotate the assembly about a pivot axis extending through the torsion beam.

In exemplary embodiments, the torsion limiter de-couples excess torsion such that the external force is released by allowing the array to move to a second rotational position. The movement in the direction of the torsion may comprise movement of the solar tracker assembly from a first rotational position to at least one second rotational position. In exemplary embodiments, when the external force is great enough, the solar tracker moves to an extreme rotational position stop position. The maximum rotational position mechanical stop is at a maximum angle of rotation and is then resisted at multiple points in the tracking structure so that the main torsional resisting structural member is ultimately supported rotationally at multiple points, effectively limiting the torsion in the torsion beam structure.

The movement in the direction of the torsion may comprise movement of the solar tracker assembly from a first rotational position to a second or multiple rotational positions. In exemplary embodiments, the solar tracker assembly is constrained in its maximum rotational positions at multiple distributed locations along a torsional resisting structure of the solar tracker assembly. The torsion limiter limits the hinge moment about the pivot axis extending through the torsion beam when the tracker is not at the extreme positions by allowing the tracker to rotate to release torsional force and then the multiple stops at the extreme positions ultimately limit the torsion in any one section of the torsion resisting structural member when the system cannot rotate any further.

In exemplary embodiments, the drive system of the solar tracker assembly comprises a gear assembly including at least one gear wheel. In exemplary embodiments, the gear assembly includes a one-way gearbox and the torsion limiter is a torsion limiting clutch. The torsion limiter may also be a slip clutch in some embodiments. In exemplary embodiments, the gear assembly includes a friction coupling engaging the gear wheel and the torsion limiter is located at the friction coupling. The torsion limiter may be located at the output of a first gear stage of the gear assembly. In other exemplary embodiments, the solar tracker assembly is a push/pull linked tracker and the torsion limiter is a linear slip device or linear clutch linkage. The solar tracker assembly may include a hydraulic system and the torsion limiter may be in the form of a pressure relief valve in the hydraulic system. The solar tracker assembly may further comprise a damper incorporated at or near the gear rack to control the release of torsional force and slow the motion of the solar tracker assembly.

Exemplary embodiments include methods of aligning a solar array comprising a plurality of rows of solar trackers, providing a torsion limiter individually connected to each row of solar trackers, where one or more of the solar trackers encounter a mechanical rotational limit which causes the level of torsion induced by the driveline in the at least one row of solar trackers to exceed the torsion limit threshold, whereby the torsion limiter allows the mechanically limited at least one row not to rotate while simultaneously driving the rotation of the other multiple rows of solar trackers. The plurality of rows of solar trackers includes multiple rows of linked solar trackers. The mechanical limit condition on at least one row of solar trackers of the multiple rows of solar trackers creates a level of torsion in the tracker that exceeds a pre-set threshold.

The at least one mechanically limited row does not rotate while the other multiple rows of solar trackers rotate and reach their maximum mechanical limit position until all of the plurality of rows of solar trackers are no longer rotating. As each row reaches its maximum mechanical limit position, each tracker row stops rotational movement while the other multiple rows of solar trackers rotate and reach their maximum limit positions. When all the tracker rows reach their mechanical limits, they are all in alignment.

The same mechanism that limits and releases the driving torque at a safe threshold is also advantageous if one or more tracker rows are obstructed from external environmental conditions such as a snow drift, sand dune or other impediment. The torsion limiter may protect the tracked array from damage by the obstruction while also allowing the tracker to rotate in a limited motion until the obstruction is cleared.

In exemplary embodiments, during over torsion from external forces, the movement in the direction of the torsion comprises movement of at least one row of solar trackers from a first rotational position to at least one second rotational position. The movement in the direction of the torsion may comprise movement of at least one row of solar trackers from a first rotational position to multiple rotational positions. In exemplary embodiments, the at least one row of solar trackers hits multiple mechanical constraints in the multiple rotational positions or maximum limit positions. Each row of solar trackers may include a plurality of support columns and a stop at each support column. Exemplary embodiments further comprise incorporating a damper near or at the torsion limiter to control the release of torsional force and slow the motion of the solar tracker assembly.

Exemplary embodiments of a singular motorized solar tracker assembly comprise a support column, one or more torsion beams connected to the support column, a solar module mounting system attached to the one or more torsion beams, a drive system connected to the one or more torsion beams, and a motor brake. The drive system comprises a bi-directional gearbox having an input and an output, and the motor brake is located at the input of the bi-directional gearbox. When an external force causes a level of torsion on the drive system to exceed a pre-set limit, the motor brake slips, or if the motor brake is internal to the motor itself the motor is driven backwards through the system, which facilitates back-driving of the system and release of the torsional force.

In exemplary embodiments a gear drive system comprises a gear assembly including a torque-limiting clutch and at least one worm gear wheel. The gear assembly may or may not be contained in a gearbox. When a level of torque on the gear exceeds a preset level the clutch slips. The gear assembly may include two taper sections engaging the worm gear wheel. In exemplary embodiments, the torque limiting clutch is located at the two taper sections. The clutch may be adjustable via a nut that varies the spring tension at the taper sections. This slip clutch may take alternate forms in exemplary embodiments and in other forms as necessary for different types of gear-driven mechanical systems.

In exemplary embodiments, a solar tracker assembly comprises at least one support column, a torsion beam connected to the support column, with a pivot axis extending through the torsion beam, a mounting mechanism attached to the torsion beam, one or more solar modules mounted to the mounting mechanism, and a gearbox assembly containing a torque limiting clutch and at least one worm gear wheel. When a level of torque on the gearbox exceeds a preset threshold, the clutch slips.

Exemplary embodiments of a gear-driven mechanical system comprise at least one gear-driven mechanical unit including at least one gear rack and a gear drive system engaging with the gear rack. The gear drive system comprises a gear assembly including at least one gear wheel, and a torque-limiting clutch located at an output of the gear assembly and prior to a location where the gear drive system engages the gear rack. When a level of torque on the gear assembly exceeds a preset level the clutch slips, releasing the torque on the gear-driven mechanical unit.

In exemplary embodiments, the gear assembly includes at least one taper section engaging the gear wheel and the torque limiting clutch is located at the taper section. The clutch may be adjustable via a nut that varies the spring tension at the taper section. In exemplary embodiments, the gear-driven mechanical unit is rotatable. In exemplary embodiments, the gear-driven mechanical unit rotates to a hard stop position at its maximum angle of rotation.

Exemplary embodiments of a gear-driven mechanical system comprise at least one gear-driven mechanical unit rotatable about a rotational axis and a gear drive system. The gear-driven mechanical unit includes at least one gear rack and the gear drive system engages with the gear rack. The gear drive system comprises a gear assembly including at least one gear wheel and a torque limiting clutch located at an output of the gear assembly. When a level of torque on the gear assembly exceeds a pre-set level, the clutch slips, releasing the torque on the gear-driven mechanical unit and limiting a hinge moment about the rotational axis.

In exemplary embodiments, the torque limiting clutch is located at the output of a first gear stage of the gear-driven mechanical unit. In exemplary embodiments, the torque limiting clutch is incorporated in the input to the gear rack of the gear-driven mechanical unit. The at least one gear-driven mechanical unit may comprise a plurality of gear-driven mechanical units. In exemplary embodiments, each gear-driven mechanical unit rotates to a mechanically limited stop position at its maximum angle of rotation.

Exemplary embodiments of a solar tracking system comprise at least one solar tracker assembly being held rotationally through a torque-limiting clutch. The solar tracker assembly includes at least one support column, a torsion beam connected to the support column, a module mounting means attached to the torsion beam, and at least one gear drive assembly connected to the torsion beam. A pivot axis extends through the torsion beam. The torque limiting clutch engages the gear drive assembly. When the level of externally applied torque on the gear drive assembly exceeds a preset level, the clutch slips allowing the tracking system to rotate, thereby releasing the torque on the solar tracker assembly and reducing the hinge moment about the pivot axis.

In exemplary embodiments, the torque limiting clutch is located at the output of a first gear stage of the solar tracker assembly. In exemplary embodiments, the torque limiting clutch is incorporated in the gear drive assembly of the solar tracker assembly. The gear drive assembly may include a main driving gear wherein the torque limiting clutch is incorporated on an output of the main driving gear. In exemplary embodiments, the solar tracker assembly rotates to engage a mechanical stop at its maximum angle of rotation.

The solar tracking system may be a linked system wherein the torque limiting clutch is incorporated between an arm connection and the torsion tube. The solar tracking system may be a push/pull linked tracker. In other exemplary embodiments, the solar tracking system is hydraulically driven, and the torque limiting clutch is a pressure relief valve.

Accordingly, it is seen that torsion limiters, torque-limiting clutches, gear drive systems, solar trackers, and related torque release methods are provided. The disclosed devices, systems, and methods provide a preset torque release mechanism, thereby reducing or eliminating the hinge moments and other dynamic forces on the PV tracking structure.

These and other features and advantages will be appreciated from review of the following detailed description, along with the accompanying figures in which like reference numbers refer to like parts throughout.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which:

FIG. 1A is a schematic of an exemplary embodiment of a mechanical unit in accordance with the present disclosure;

FIG. 1B is a schematic of an exemplary embodiment of a mechanical unit in accordance with the present disclosure;

FIG. 1C is a schematic of an exemplary embodiment of a mechanical unit in accordance with the present disclosure;

FIG. 1D is a schematic of an exemplary embodiment of a mechanical unit in accordance with the present disclosure;

FIG. 8 is a perspective view of an exemplary embodiment of a linked gear drive solar tracker array including an exemplary torque-limiting clutch in accordance with the present disclosure;

FIG. 24A is a perspective view of an exemplary embodiment of a limit stop in accordance with the present disclosure;

FIG. 24B is a side view of the limit stop of FIG. 24A; and

FIG. 24C is a cross-sectional view of the limit stop of FIG. 24A.

DETAILED DESCRIPTION

Figure 2:
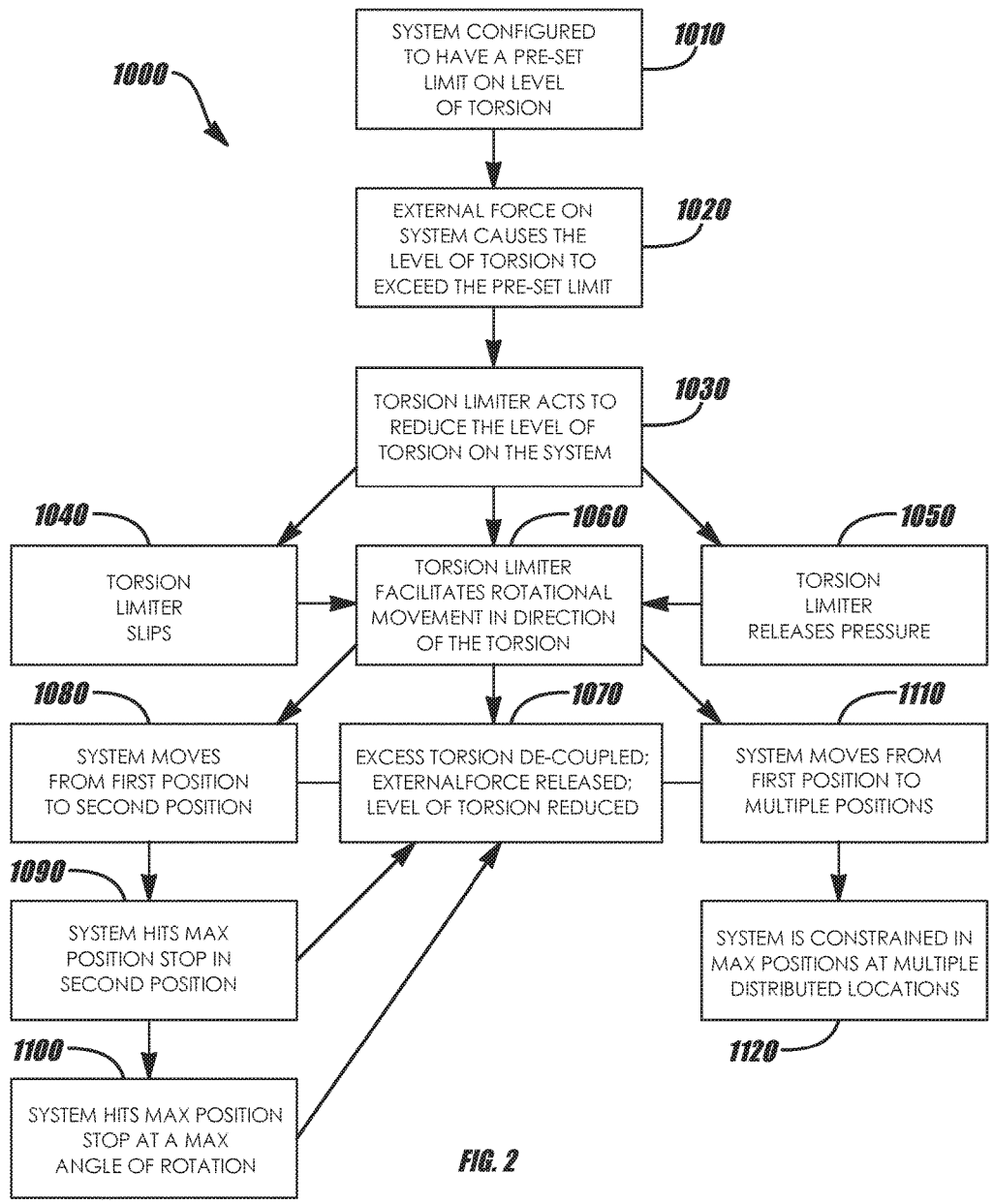
FIG. 2 is a process flow diagram of an exemplary method of limiting torsion in accordance with the present disclosure.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Exemplary embodiments of torsion limiters may be advantageously used in any kind of driven system that may be exposed to external forces such as high wind forces and could benefit from the ability to resist the external force at multiple points along the structure instead of just at a single point. Solar trackers are one example of such a system, and exemplary embodiments could be used in any kind of solar tracker, including but not limited to single-axis trackers such as horizontal, tilt and roll, and azimuth, as well as dual-axis trackers. Exemplary embodiments include any solar tracker design that includes a torsion limiter connected between the output of the drive and the collector array where the torsion limiter releases at a pre-set level of torsion force. Exemplary embodiments include solar trackers that are gear-driven, hydraulically driven, or driven by any other means. Exemplary tracker geometries incorporate a worm-gear primary gear drive, either attached to the tracker frame directly or through a secondary stage such as a spur gear rack, D-ring chain drive, or cable system mounted to one or two column supports for the tracker. Exemplary solar tracker embodiments may incorporate a balanced array such that the torsion limiter force remains constant at any tracker rotational angle.

Exemplary embodiments of the disclosure release torsion in a tracking system so the system moves out of a high torque position to a second position and stops, or if the external force is great enough, the system moves to an extreme position where torsion force can be resisted at multiple points instead of at a single point, usually the center of the system. Alternatively, if the system encounters an obstruction such as a sand dune, snow, ice, or some other external obstruction, torque from the system's drive motor is released from the input drive by the torsion limiter. Furthermore, in the linked drive system, only the row or rows that are affected by the obstruction do not move while the other unobstructed linked rows will continue to track. Thus, exemplary embodiments advantageously provide the benefit of releasing two different types of torque, external torsion forces from the wind and/or internal torsion forces generated by the drive when the tracking system output is obstructed.

In windy conditions, the wind force induces a hinge moment on the tracker system. If the hinge moment is greater than the holding force of the torsion limiter, the torsion limiter releases the torsion and the tracker moves to second position at which the force may be lessened because the wind gust has reduced or the hinge moment has been reduced as a result of the new rotational position. If the movement continues and the system is driven to the extreme position multiple mechanical stops, then the wind can be resisted at multiple points instead of at a single point. Advantageously, systems employing exemplary embodiments of torsion limiters react in a natural or passive way, without the need for electronics such as a motor or active release. In exemplary embodiments, the torsion limiter is a clutch assembly which passively slips and has the opportunity to correct itself twice a day, once in the morning and once in the evening as the motor drives the system into the extreme stop positions.

As the wind acts on a tracked PV array, the wind normally causes a hinge moment $M_H$ to occur about the rotational axis of the tracker as shown in FIGS. 1A-1D. The features and characteristics of an exemplary solar tracker subject to the wind are designated as follows:

| Symbol | Feature or Characteristic |
|---|---|
| $A_S$ | Module Surface Area |
| $M_H$ | Hinge Moment due to wind loading |
| $M_G$ | Total Ground Moment Reaction |
| $R_D$ | Ground Drag Reaction |
| $R_L$ | Ground Lift Reaction |
| $\Theta$ | Tracker Angle from y-axis |
| $F_D$ | Drag Force due to wind loading |
| $F_L$ | Lift Force due to wind loading |
| $q_z$ | Dynamic Velocity Pressure of wind |
| $\Gamma$ | Yaw Angle of Wind from the y-axis |

As mentioned above and described in more detail herein, exemplary torsion limiters and related gear drives and solar trackers reduce or eliminate the hinge moment on the tracker.

FIG. 2 shows an exemplary method 1000 incorporating a torsion limiter. A torsion limiter is any device that can limit, release, relieve, or otherwise reduce the level of torsion, torque, or other external force on a system by any means, including but not limited to, slipping, de-coupling force, releasing pressure, facilitating movement, or separating components of a system. As discussed in more detail herein, there are many design variants of torsion limiters. The system may be configured to have a pre-set limit on the level of torsion to which it can safely be exposed (1010). When an external force causes a level of torsion on the system to exceed the pre-set limit (1020) the torsion limiter acts to reduce the level of torsion on the system (1030). As discussed in more detail herein, depending on the type of torsion limiter, the torsion reduction action can be slipping (1040), releasing pressure (1050), and/or facilitating rotational movement of the system in the direction of the torsion (1060).

In exemplary embodiments, when the system moves in the direction of the torsion it de-couples excess torsion such that the external force is released and the level of torsion on the system is reduced (1070). In exemplary embodiments, the system's movement in the direction of the torsion means the system moves from a first position to at least one second position (1080). The system may hit a maximum position stop in the at least one second position (1090). If the movement is rotational movement, the maximum position stop may be at a maximum angle of rotation (1100). The movement in the direction of the torsion may be from a first position to multiple positions (1110). In exemplary embodiments, the system is constrained in its maximum positions at multiple distributed locations along a torsional resisting structure of the solar tracker assembly (1120).

Figure 3:
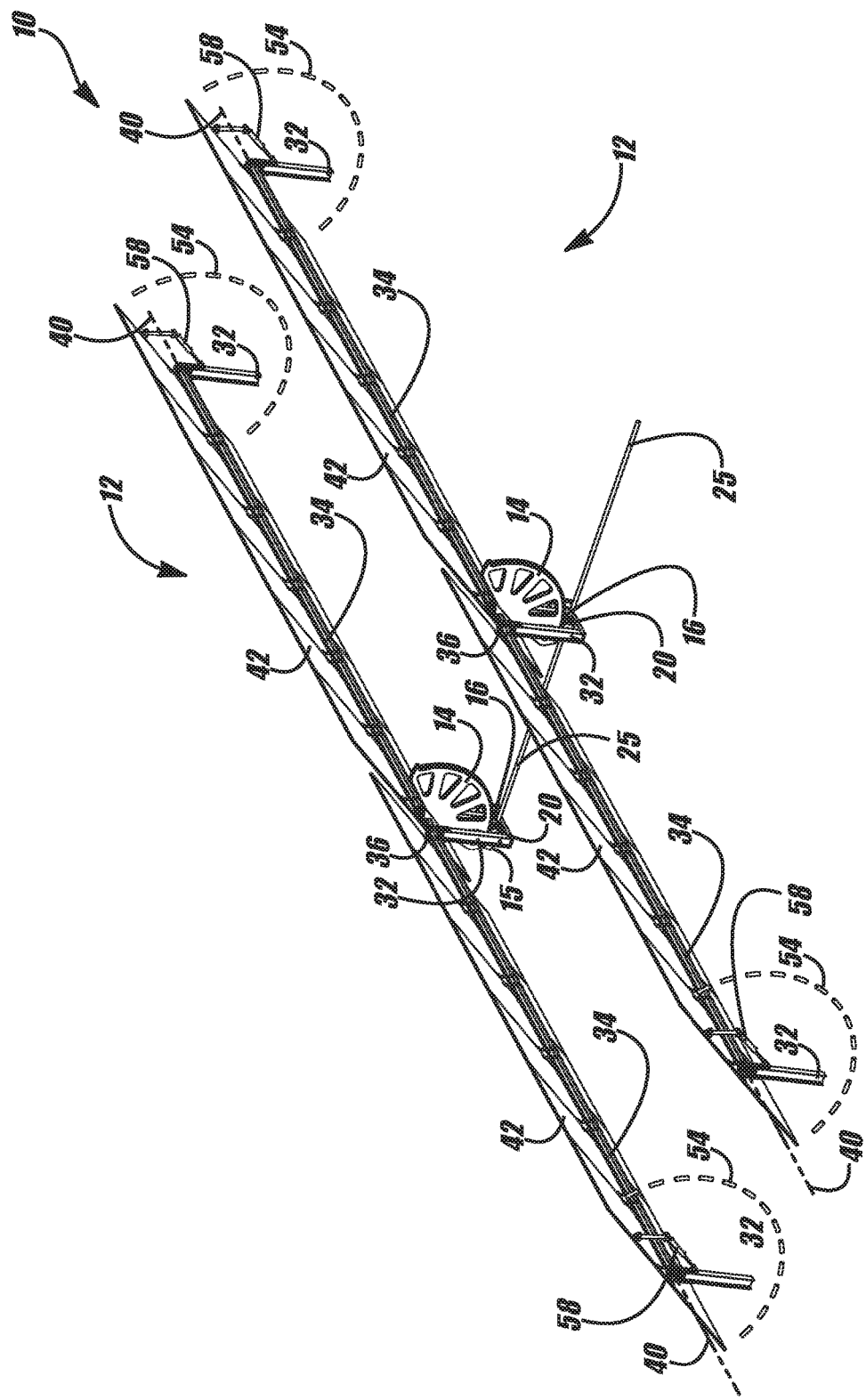
FIG. 3 is a perspective view of an exemplary embodiment of a solar tracker in accordance with the present disclosure.
Figure 4:
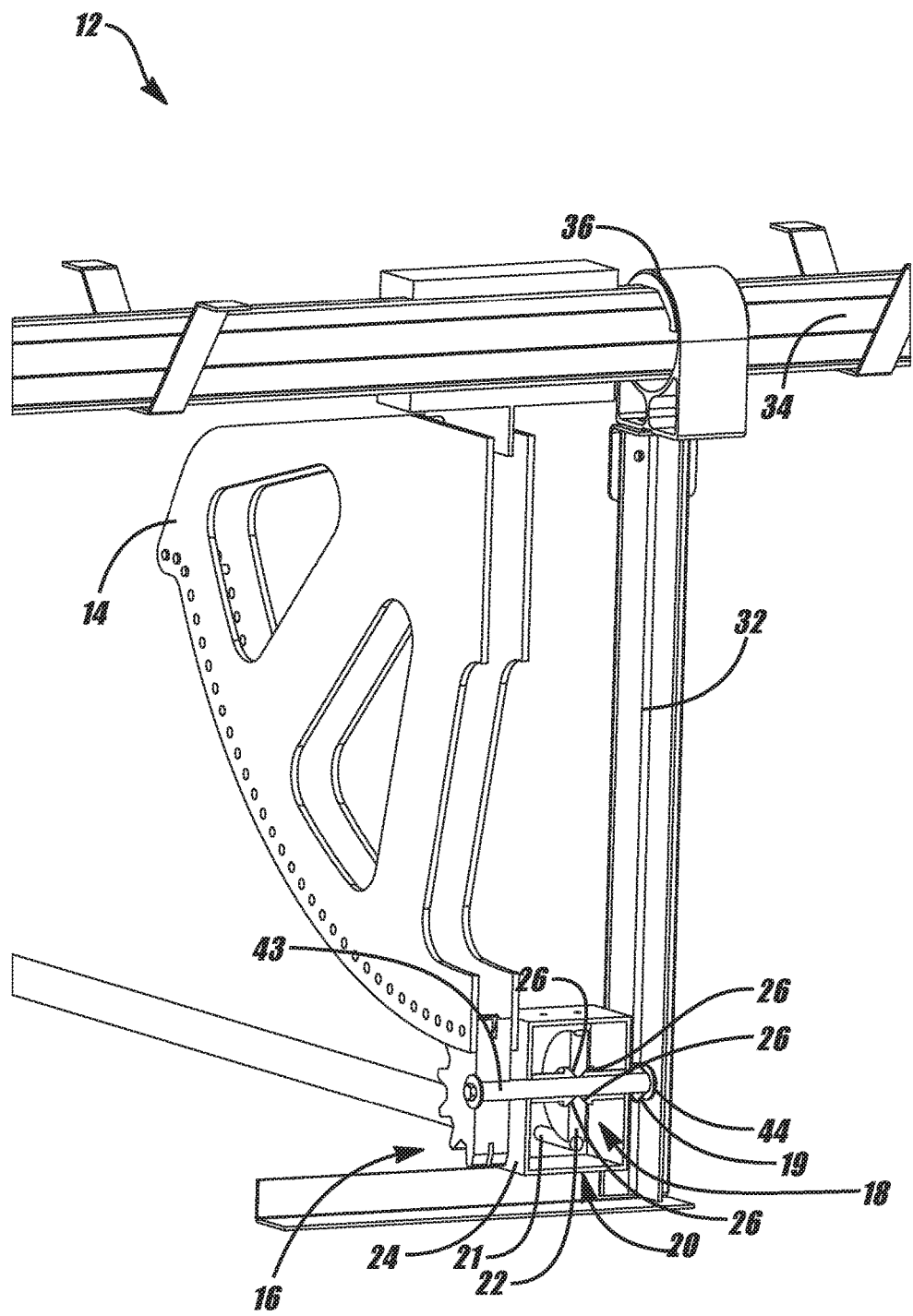
FIG. 4 is a detail cutaway view of an exemplary embodiment of a solar tracker including a torsion limiter in accordance with the present disclosure.
Figure 5:
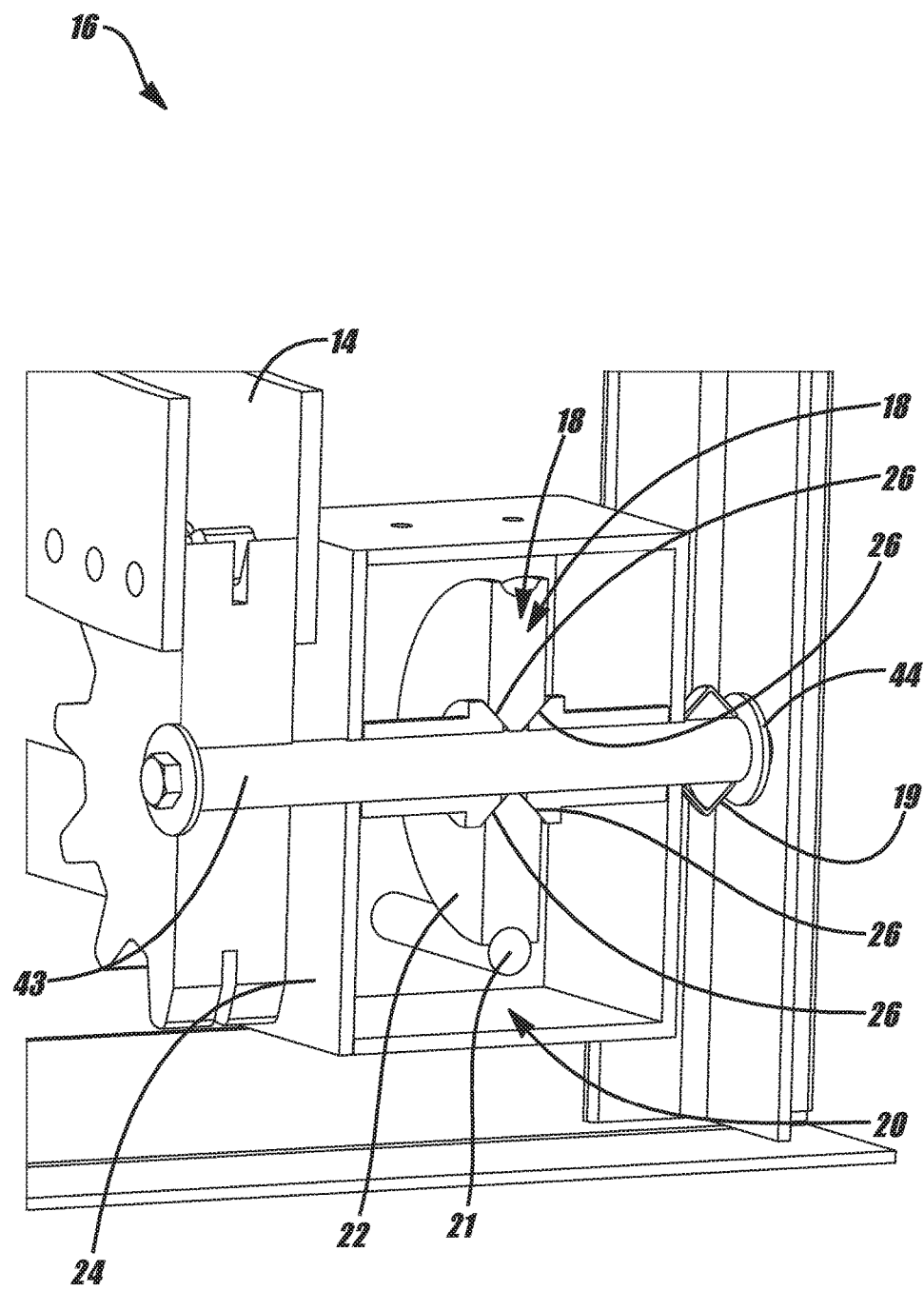
FIG. 5 is a detail cutaway view of an exemplary embodiment of a gear-driven mechanical unit including a torsion limiter in accordance with the present disclosure.

Referring to FIGS. 3-5, an exemplary embodiment of a gear-driven mechanical system 10 and a torsion limiter 18 will be described. Gear-driven mechanical system 10 may be any kind of mechanical system having one or more mechanical units and using gears to drive mechanical components for rotation, movement and/or to generate work, including but not limited to transportation systems, agricultural systems, manufacturing systems, and energy conversion and/or power generation systems. An exemplary gear-driven mechanical system 10 comprises at least one gear-driven mechanical unit 12 that includes a gear rack 14. The mechanical system 10 may also include a gear drive system 16 that incorporates a torsion limiter such as a torque limiting clutch 18. More particularly, an exemplary gear drive system 16 comprises a torque limiting clutch 18 and a gear assembly 20 including at least one gear wheel 22.

A motor 15 may be provided to drive the gear drive system 16, which in turn rotates a beam or tube, e.g., torsion tube 34, directly, or drives a gear rack 14, which in turn drives the torsion tube or other module mounting beam structure 34. As illustrated in FIG. 3, the gear rack 14 may be a spur gear rack or D-ring chain drive, which is affixed to a rotatable tube, e.g., torsion tube 34, of the mechanical unit 12. Thus, when activated by gear drive system 16, a mechanical unit 12 is rotated. In exemplary embodiments, the torque-limiting clutch 18 is located at an output of the gear assembly 20, on the first gear stage of the mechanical unit 12, and prior to a location where the gear drive system 16 engages the gear rack 14 of the mechanical unit 12. A second, third, etc. mechanical unit, similar to tracking assembly 12 can be connected to drive shaft 25 with a separate and similar worm assembly. This can be repeated for several mechanical units in a gear-driven mechanical system.

Turning to FIGS. 4 and 5, an exemplary embodiment of a torque-limiting clutch 18 can be seen in a cutaway section view of an exemplary gearbox 24. The gear wheel 22 may be any kind of gear wheel and is shown, by way of example, as a worm wheel which engages worm 21. As best seen in FIG. 5, the worm wheel 22 may define two taper sections 26 at the center. In exemplary embodiments, the clutch 18 is located at these taper sections 26. In exemplary embodiments, there may be two steel tapers 26 that engage the worm wheel gear 22 under spring tension. The clutch may be adjustable via a nut 44 or other equivalent mechanism that varies the spring tension on the taper 26. Gearbox output shaft 43 connects the gearbox 24 to the gear rack 14. In exemplary embodiments, springs 19 are provided on the output shaft 43. The springs could be in the form of washers 19 such as Belleville washers. As best seen in FIG. 5, the washers 19 are conical discs facing each other on the output shaft 43 outside the gearbox 24. The washers 19 act as springs that provide the pressure for the conical sections against the worm wheel 22.

When a level of torque on the gear assembly 20 exceeds a preset level the clutch 18 slips. More particularly, when the friction of the clutch 18 on the tapers 26 is overcome due to increased torque, the clutch 18 will slip. This advantageously releases the torque on the gear-driven mechanical unit 12. This torque-release feature is particularly advantageous in exemplary embodiments where the mechanical units 12 are rotatable because it limits the hinge moment $H_M$ about the rotational axis of the units.

Various mechanical conditions may occur in exemplary embodiments of a clutch, gear drive, and mechanical system with one or more mechanical units, which may be a solar tracking system that includes one or more trackers. Referring to FIGS. 1 and 3, an exemplary solar tracker 12 comprises at least one support column 32, which may be any shape and composed of any material so long as it is capable of supporting the PV modules and other components mounted thereto. Exemplary embodiments of a solar tracker 12 include two spaced-apart support columns 32a and 32b. A torsion beam 34 or other tracker structure is connected to the support column 32. More particularly, the torsion beam bridges the two support columns 32a, 32b and may be attached to the support columns by a bearing 36 and bearing housing arrangement including any suitable fasteners.

The torsion beam 34 may be any shape or configuration suitable for supporting a mounting rack or other mounting mechanism, including multiple connected beams, and in exemplary embodiments it has a circular-, square- or hexagonal-shaped cross section. In a system that has overhung weight, the overhung dead load torsion varies as the system rotates. Alternate exemplary torsion beam embodiments may be configured with a balanced center of gravity, such that the weight of the array is rotated about the balance point. This balanced system may be advantageous to incorporate into the torsion limiting design because, without any overhung weight, it will keep the torsional release force constant at all rotational positions.

A pivot axis 40 extends through the torsion beam 34, and the torsion beam 34 may pivot or rotate about the pivot axis 40. Solar modules 42 may be mounted to the solar tracker 12, either mounted on the torsion beam 34 using clamps 35 or via a module mounting bracket assembly. It should be noted that solar trackers could employ more than one torsion beam in a double- or multiple-beam torsion structure arrangement. In such embodiments, a tracker would have two or more torsion beams running along its length. A row of multiple trackers could have two or more torsion beams running along the length of the row.

In exemplary embodiments, the gear drive system 16 of the solar tracker 12 incorporates a torque-limiting clutch 18 on the first gear stage of the solar tracker 12. Exemplary embodiments could include a single-stage gear-driven solar tracker where the gear drive system 16 is a single-stage worm gear drive that directly rotates the solar collector array. The torsion limiter, in the form of a clutch, could be located between the connection of the output of the worm gear drive and the solar collector array. Exemplary embodiments also include two- or multi-stage solar trackers. Gear assembly 20 includes at least one gear wheel 22, and in exemplary embodiments the gear wheel is a worm wheel.

In exemplary embodiments, the torque limiting clutch 18 is located between the connection of the output of the first stage worm gear and the second stage gear. The second or multiple stage gear or gears may be constructed of any type of bi-directional gear drive system capable of transmitting rotary force bi-directionally, including but not limited to, a spur gear, pin gear, cable drive, belt or chain drive. The torque-limiting clutch 18 may be located at an output of the gear assembly 20, on the output of the first gear stage of the solar tracker 12, and prior to a location where the gear drive system 16 engages the gear rack 14 of the solar tracker 12. As discussed above, the clutch 18 may be located at two taper sections 26 of the worm wheel gear 22. The two steel tapers 26 engage the worm wheel gear 22 under spring tension, which may be adjustable via a nut 44 or other adjustment mechanism.

In exemplary embodiments, the torque-limiting clutch may be incorporated into a plurality of solar trackers 12 connected into an array layout comprised of one or more rows 46 of solar trackers. More particularly, multiple solar trackers 12 may be mechanically linked in a large array configuration 50 so they may operate in unison, driven by a single motor and tracker controller. The array configurations could be implemented by providing a rotary drive linkage system underneath the solar tracker array. Another bearing system, such as a slew drive, may also be incorporated in the fixed-tilt azimuth tracking geometry if it is properly designed to withstand the load forces applied near the base of the array support. In alternative exemplary embodiments, the array could have a motor at each solar collector gear drive. In single motorized gear drive embodiments, a torsion limiting feature may be incorporated into the motorized gear drive assembly. In exemplary embodiments, the drive system could incorporate the linked worm-gear drive into a carousel type fixed tilt azimuth tracking array field. In such embodiments, the tilted solar array is rotated on a large area circular bearing to track the sun.

Figure 6:
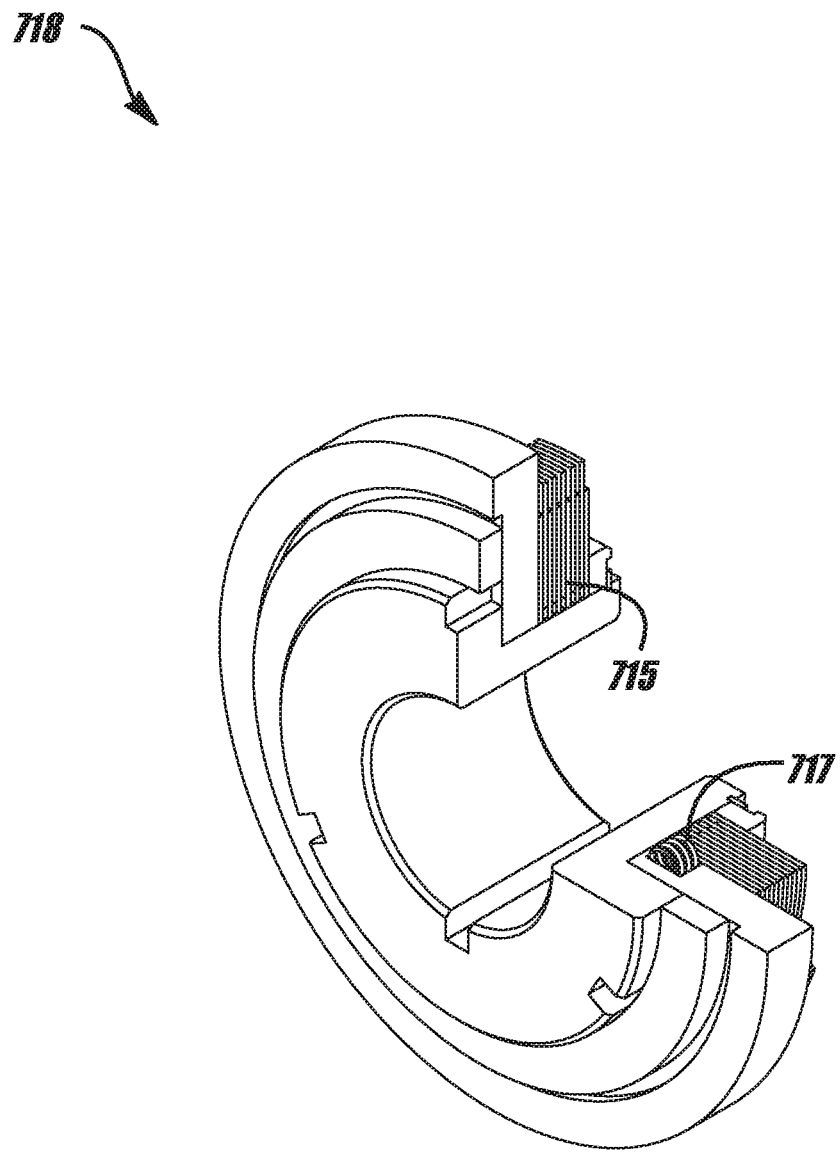
FIG. 6 is a perspective view of an exemplary embodiment of a multiple friction plate torsion limiter in accordance with the present disclosure.
Figure 7A:
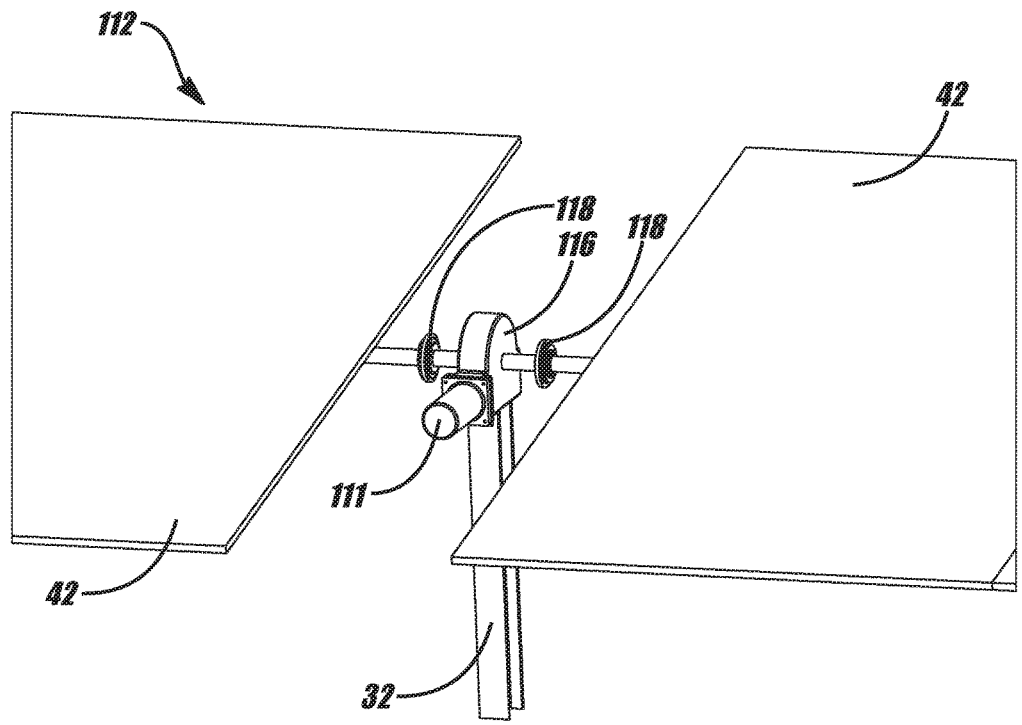
FIG. 7A is a perspective view of an exemplary embodiment of an individually motorized solar tracker incorporating an exemplary torsion limiter in accordance with the present disclosure.
Figure 7B:
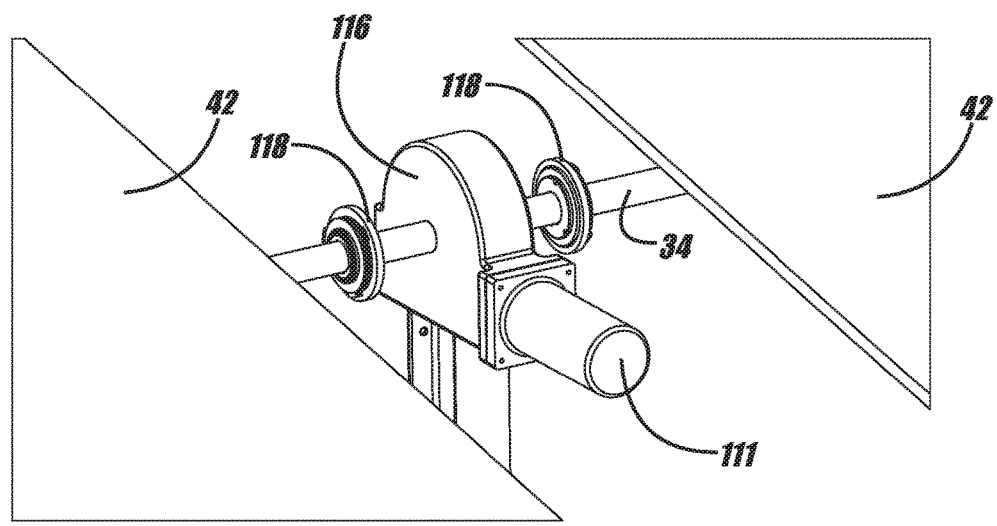
FIG. 7B is a perspective view of the solar tracker of FIG. 7A.

Turning to FIG. 6, an exemplary embodiment of a high-torsion, spring force, multiple-plate torsion limiter 718 may be comprised of multiple interleaved spring loaded friction plates 715. Springs 717 create a friction force on the friction plates 715 causing an increase in the friction surface area of the torsion limiter 718. This design is an exemplary variant of the spring loaded tapered cone torsion limiter depicted in FIGS. 4 and 5. The inside diameter may be connected to one shaft and the outside diameter connected to a different shaft. The torsion limiter 718 limits the torsion between the two shafts. The torsion limiter can be incorporated inside a worm gear drive unit between the gearing and the output, as shown in FIG. 7B, or mounted outside of the worm gear unit on the connection of the torsion tube to the worm gear unit, as illustrated in FIG. 7A. Alternatively, it can be connected to the torsion tube on the inner diameter and the linear arm to limit torsion on the array of a linked tracking system, as in FIG. 10.

Exemplary embodiments of systems using torque-limiting clutch assemblies are shown, as solar tracker systems by way of example, in FIGS. 7A-12B. In these and other embodiments, the torsion limiting clutch may be at a location other than on the first gear stage of the tracker. With reference to FIGS. 7A, 7B and 8, an exemplary embodiment of an individually motorized gear-driven solar tracker 112 may have a clutch 118 at the output of a gear assembly or incorporated inside the drive unit 116. Such embodiments are configured are configured similarly to the exemplary systems shown in FIGS. 3-4, in which multiple trackers are driven by a single motor, and the torque-limiting clutch 18 operates in the same way, providing the same advantages. In an exemplary solar tracker assembly 112, torsion beam 34 is connected to the support column 32, and solar modules 42 may be mounted to the tracker 112.

In an exemplary embodiment, illustrated in FIGS. 7A and 7B, the torsion limiter or clutch 118 may be located on the connection of the output of the gear drive unit 116 to the torsion tube 34 of an independently motorized gear-driven solar tracker 112. More particularly, the clutch 118 is mechanically connected to the output of the gear assembly (within drive unit 116). Alternatively, the clutch may be incorporated into other stages of the gear train such as between a brake motor and a bi-directional gear drive. Additional torsion limiting clutches 118 may be provided and, in exemplary embodiments, are located between a rotary actuator 111 and the torsion beam 34 of the tracker 112. In exemplary embodiments, the drive unit 116 houses a torque-limiting clutch. FIG. 8 shows an exemplary embodiment of a linked single-stage gear drive tracker 112 arranged in multiple rows 46 in which two torsion limiting clutches 118 are incorporated on the output of the main driving gear 116.

Figure 9:
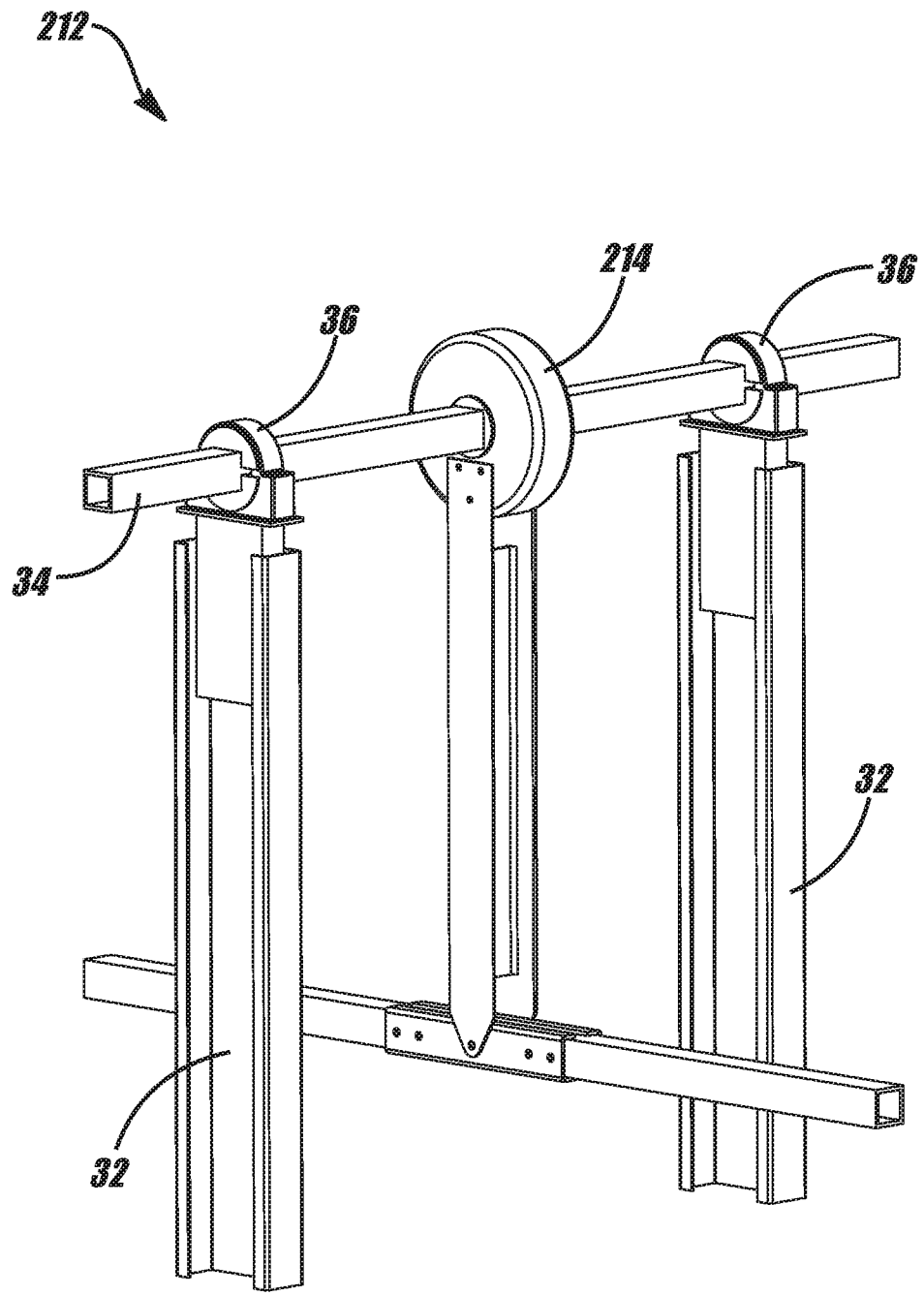
FIG. 9 is a perspective view of an exemplary embodiment of a push/pull tracker system incorporating an exemplary embodiment of a rotary torsion limiter in accordance with the present disclosure.

FIG. 9 shows an exemplary embodiment of a push/pull tracker 212 with a torsion limiter 218 on the connection of the torque arm to the torque tube 34. In exemplary embodiments, a rotary clutch could be located in the main torsion element or on the output of the gear of any kind of tracker. As shown in FIG. 9, in exemplary embodiments a torsion limiter 218 could be incorporated between the arm connection of the output of the gear drive unit 216 and the torsion tube 34 of a push/pull tracker system. More particularly, the rotary clutch 218 is mechanically connected to the gear rack 214 of the solar tracker 212, while the gear rack 214 is operatively connected to the torsion beam 34. In exemplary embodiments, the torsion limiter could be a rotary torsion limiter.

Figure 10:
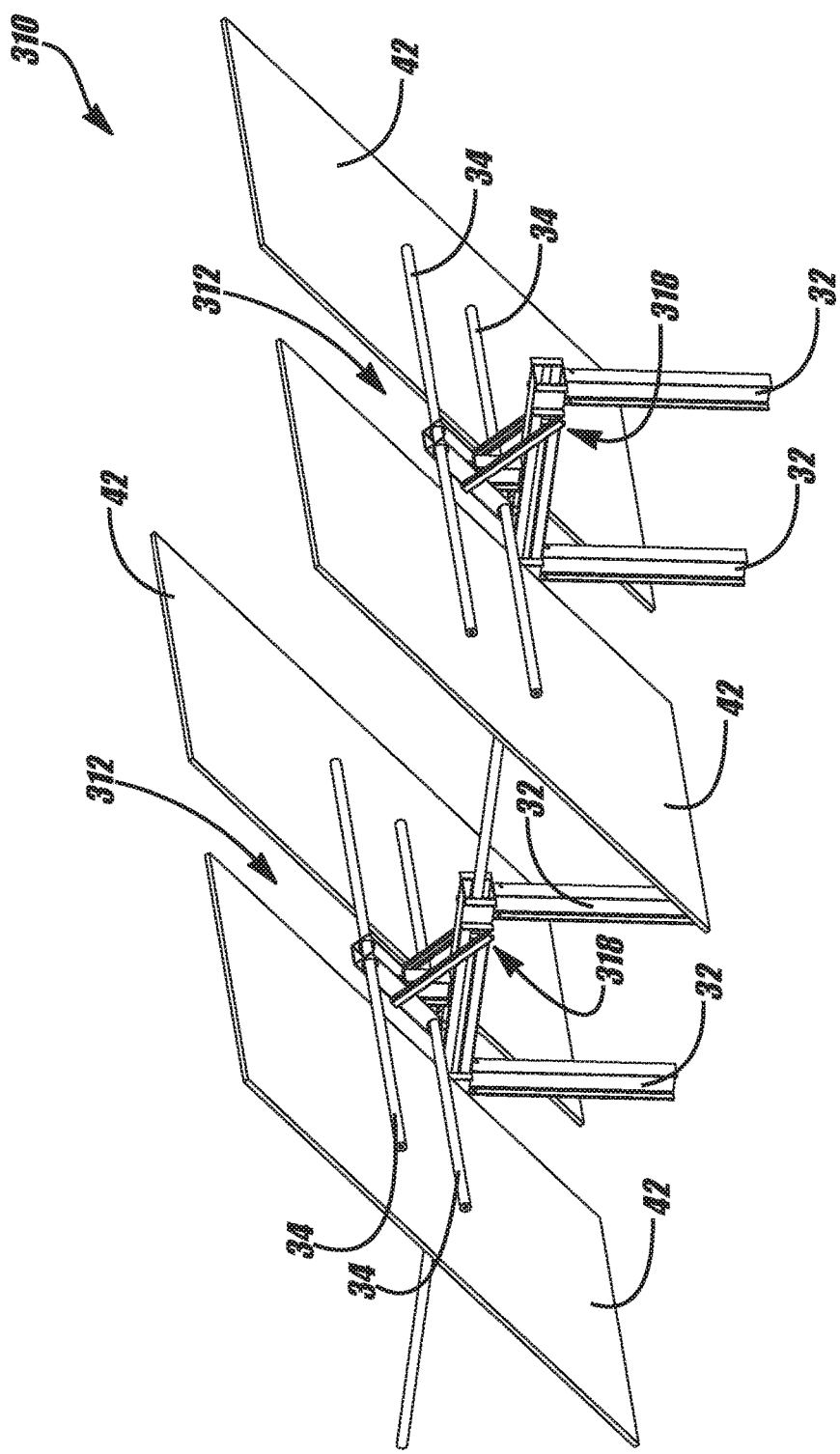
FIG. 10 is a perspective view of an exemplary embodiment of a push/pull linked tracker system including an exemplary embodiment of a linear slip force limiter in accordance with the present disclosure.
Figure 11:
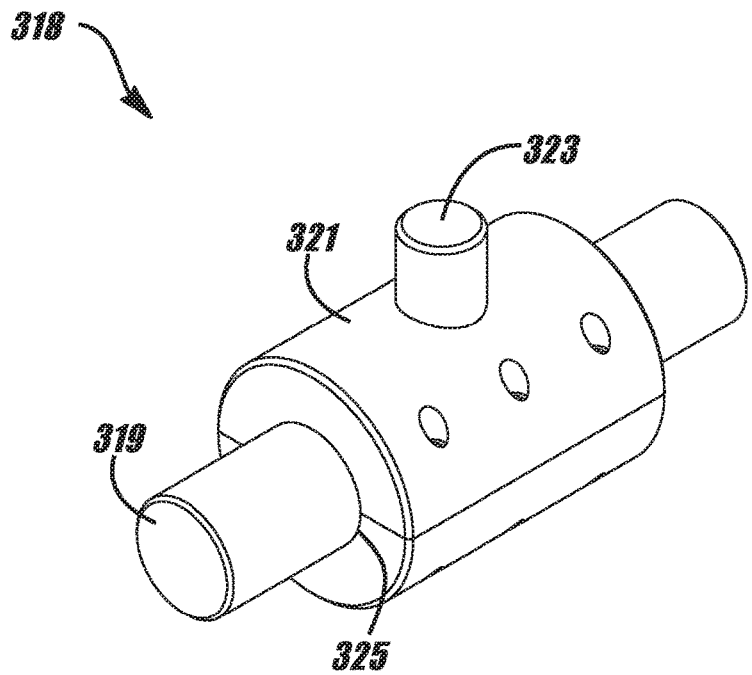
FIG. 11 is a perspective view of an exemplary embodiment of a linear slip force limiter in accordance with the present disclosure.

Referring to FIGS. 10-11, an exemplary embodiment of a push/pull linked solar tracker system 310 is shown. Here, the linkage could incorporate a linear slip force limiter 318 at each tracker 312 to achieve individual row movement to an extreme position during high winds. An exemplary embodiment of a linear force limiter 318 is shown in FIG. 11. In exemplary embodiments, the linear clutch is a friction linear slide 318 that allows the tracker to rotate while the linear linkage slips in a linear motion. Friction linear slide 318 is composed of a tube 319 and a clamp 321 which slides on the tube. The clamp 321 is mounted to the tube via trunion mount 323 and a friction mate 325 is located between the clamp 321 and tube 319. This linear friction slide device 318 can be placed in the push/pull linkage of a solar tracker. When the torsional force externally applied to the tracker is greater than the force required to overcome the friction of the slide 318, then the torsional force would be released and the tracker would be allowed to move. It should be noted that a push/pull tracker system may be individually driven or linked together with a linear drive motion.

Figure 13:
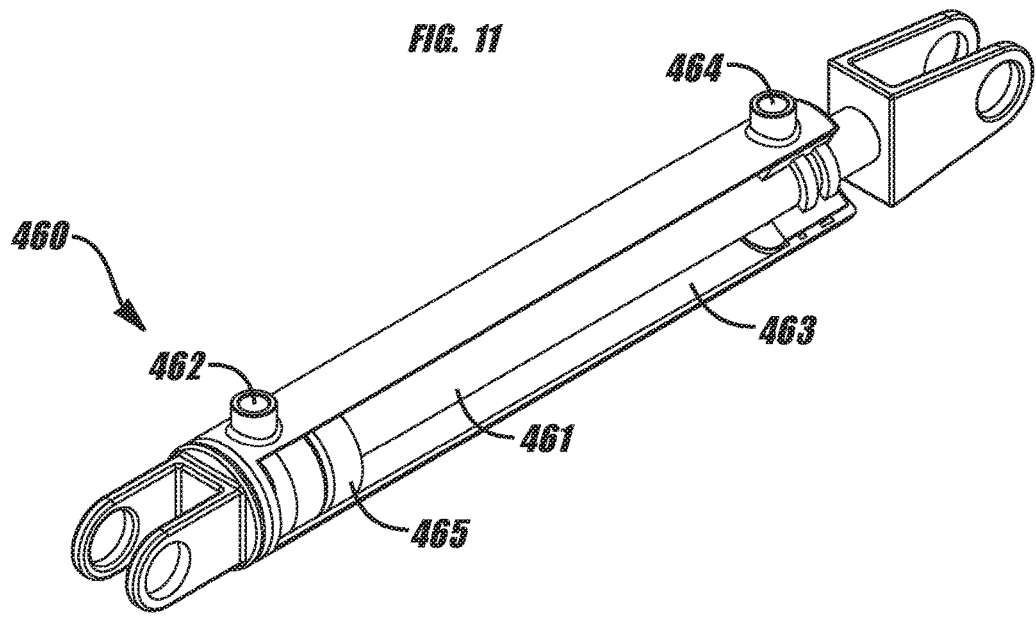
FIG. 13 is a perspective view of an exemplary embodiment of a hydraulic cylinder or ram in accordance with the present disclosure.
Figure 12A:
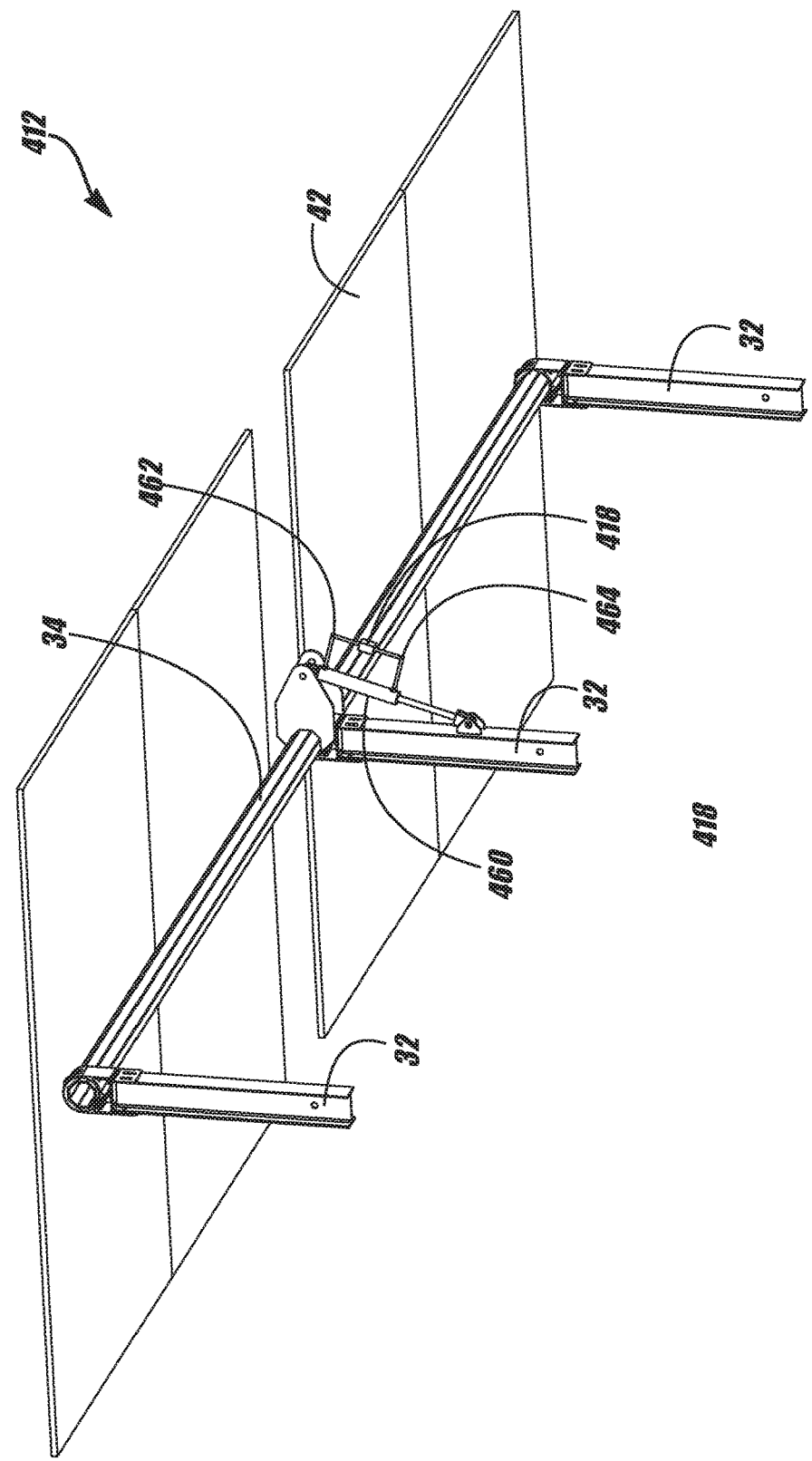
FIG. 12A is a rear perspective view an exemplary embodiment of a hydraulic ram driven solar tracker including an exemplary over pressure valve in accordance with the present disclosure.
Figure 12B:
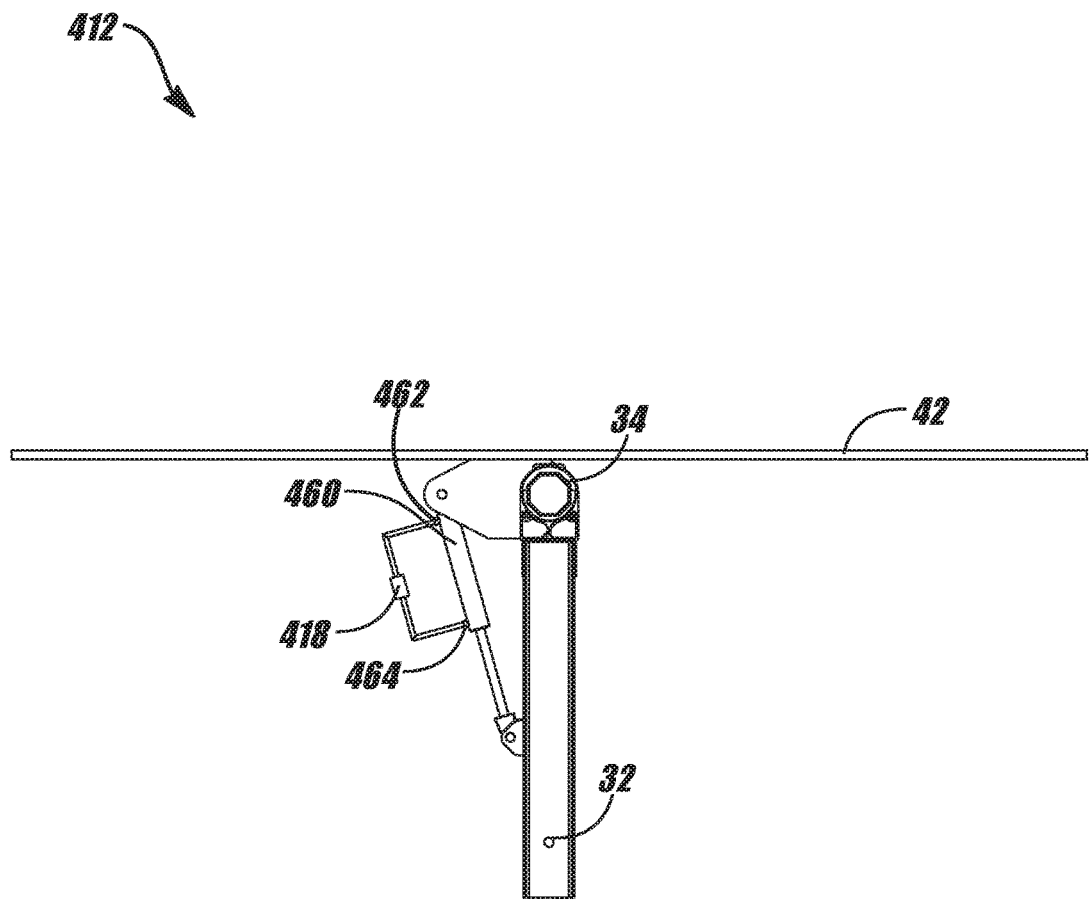
FIG. 12B is a side view of the solar tracker of FIG. 12A.

With reference to FIGS. 12A, 12B, 13 and 14, exemplary embodiments of hydraulically driven tracker systems 412 could employ a torsional relief function in the form of an over-pressure relief valve 418 to allow the tracker 412 to move to an extreme position in conditions where the tracker is exposed to excess wind force. A double acting hydraulic ram 460, or cylinder, as shown in FIG. 13, could be used to drive the hydraulic tracker 412. Exemplary embodiments of a hydraulic ram 460 has a rod 461, which could be a rod, seal 465 and other sealing components 463, an extend port 462 and a retract port 464. The linear motion of hydraulic ram 460 may be converted into rotary motion and used in a push/pull tracker design, discussed above with reference to FIGS. 10-11.

Figure 14:
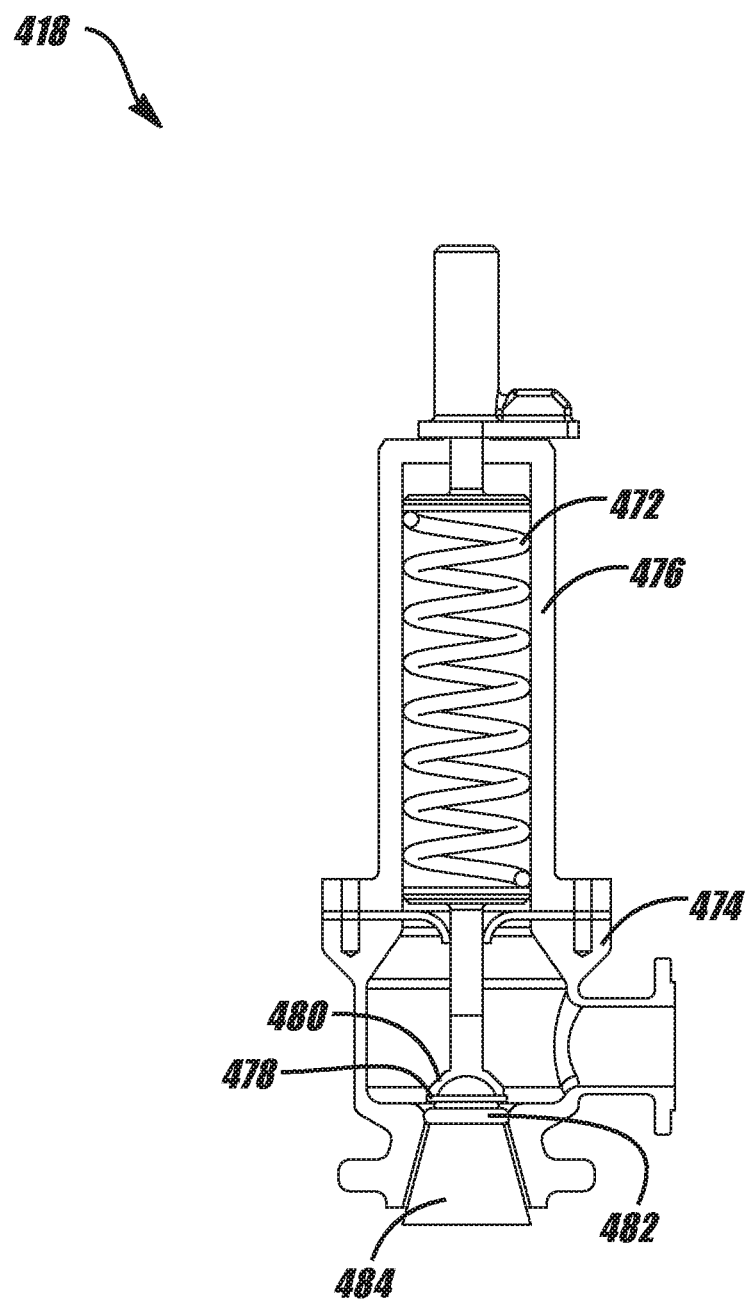
FIG. 14 is a cutaway view of an exemplary embodiment of an over pressure valve in accordance with the present disclosure.
Figure 15:
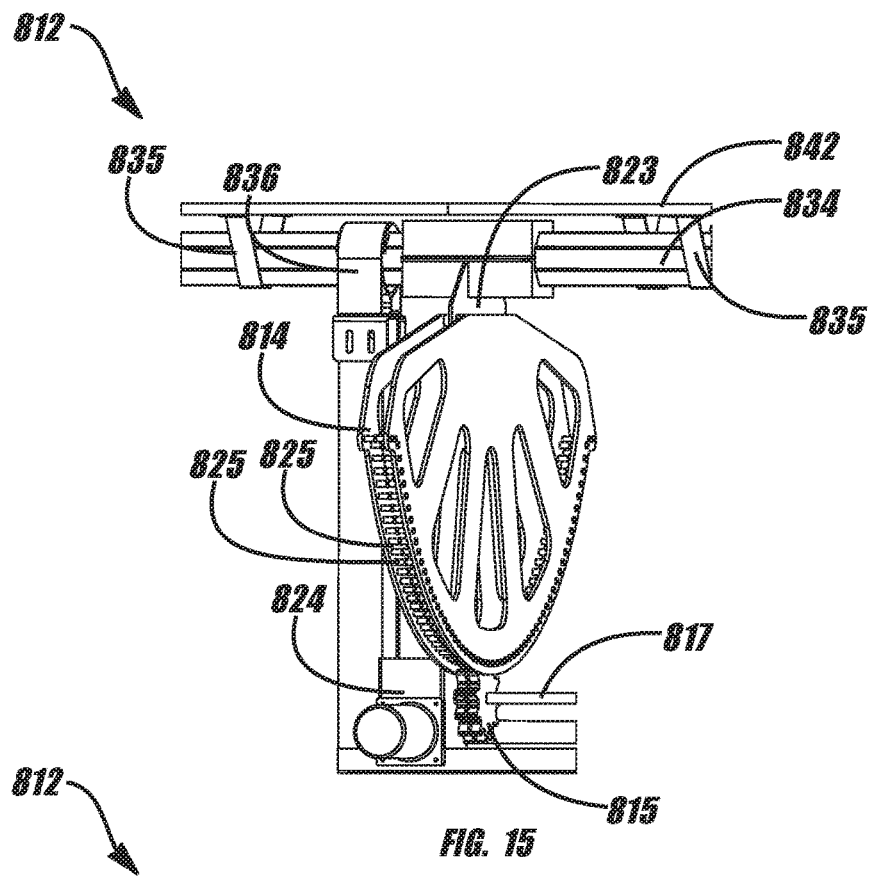
FIG. 15 is a perspective view of an exemplary embodiment of a solar tracker gear assembly and exemplary torsion limiter in accordance with the present disclosure.
Figure 16:
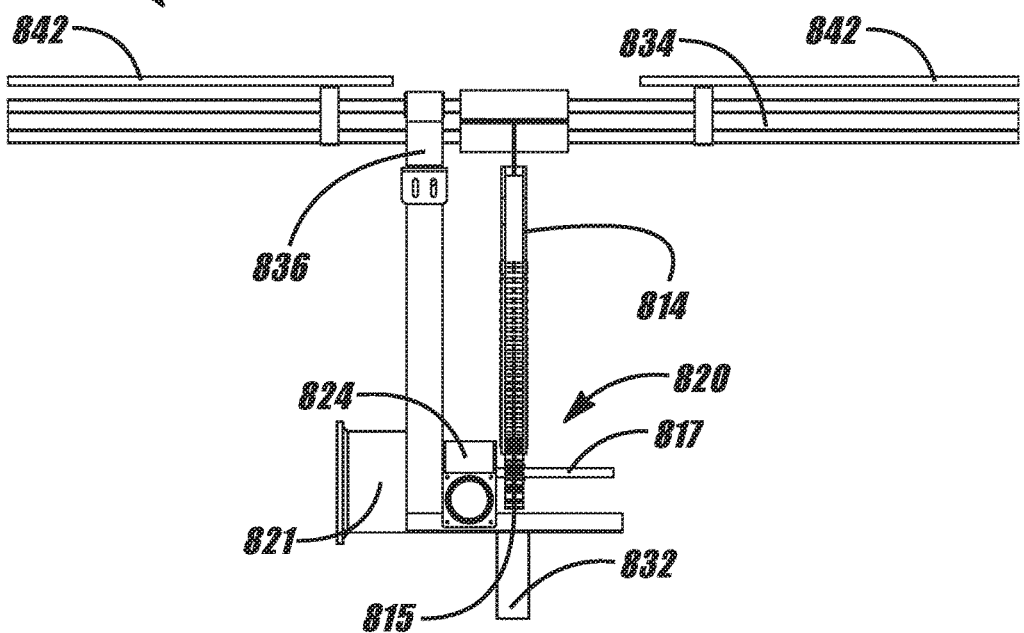
FIG. 16 is a side view of an exemplary embodiment of a solar tracker gear assembly and exemplary torsion limiter in accordance with the present disclosure.

In exemplary embodiments, hydraulic ram 460 may be fitted with an over-pressure valve 418 such as the one shown in FIG. 14. An exemplary over-pressure valve 418 has a spring 472 contained within the valve bonnet 476. A seat disc 478 is held by a disc holder 480 within body 474. The valve 418 may further comprise a blowdown adjustment ring 482 and a nozzle 484. The over-pressure valve 418 may be incorporated into the hydraulic fluid circuit between the two chambers of the hydraulic ram 460 that positions and holds the rotational position, i.e., it may be located between the extend port 462 and the retract port 464 of the hydraulic ram 460.

This allows movement in the ram 460 when the torsion externally applied to the tracker system creates an over-pressure in the hydraulic ram. More particularly, when enough pressure hits the over-pressure valve 418, it hydraulically releases, acting as a torsion limiter for the tracker. The over-pressure relief valve 418 is designed or set to open at a pre-set pressure to release excess torsion externally applied to the tracking system 412. The pressure is relieved by allowing the pressurized fluid to flow between the two chambers of the hydraulic ram, pressure controlled by the valve 418. An air actuated tracker system could also employ a wind induced torsion relief in the form of an over-pressure relief valve to achieve the same function.

Exemplary embodiments of a motorized gear rack/tracker row assembly will now be described with reference to FIGS. 15-18. A gear rack 814 is coupled to the torsion tube 834 of a solar tracker assembly 812 and may also be attached to a support column 832 of the tracker assembly. More particularly, the gear rack 814 may be affixed to the torsion tube 834 via torsion tube bearing assemblies 836 and coupler 823. In exemplary embodiments, the gear box 824 has an internal clutch (not shown) located at an output of the gear assembly 820, which includes the gear rack 814, a pinion gear 815 with pinion gear shaft 817, and may include a gear shaft end bearing. The system may have a gear drive upright column assembly with a driving motor 821 and driving the gearbox 824. One or more photovoltaic modules 842 may be coupled to the torsion tube 834 using module mounting brackets 835.

Figure 17:
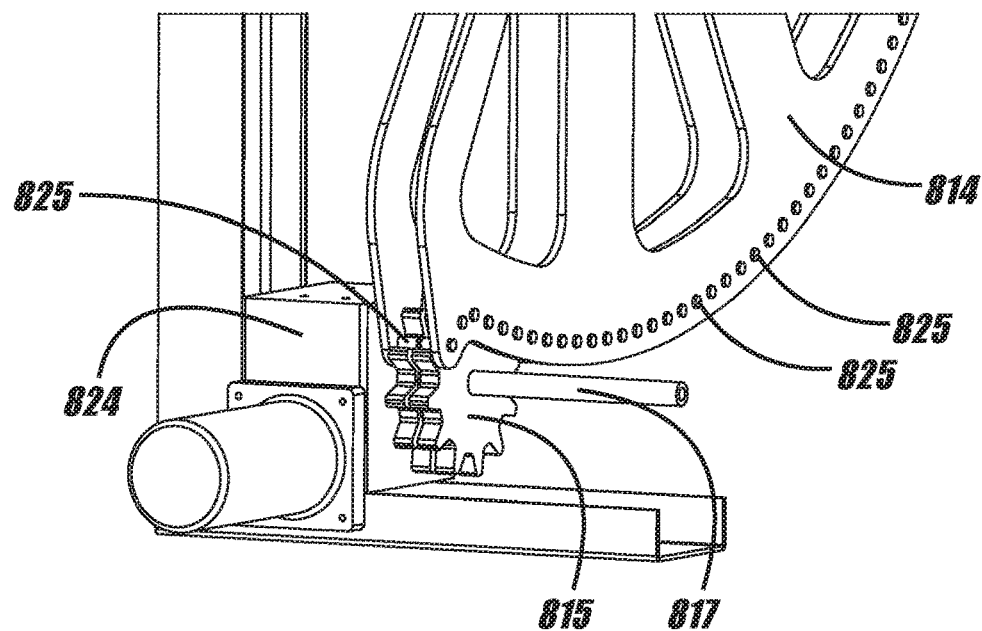
FIG. 17 is a detail view of an exemplary embodiment of a solar tracker gear assembly and exemplary torsion limiter in accordance with the present disclosure.
Figure 18:
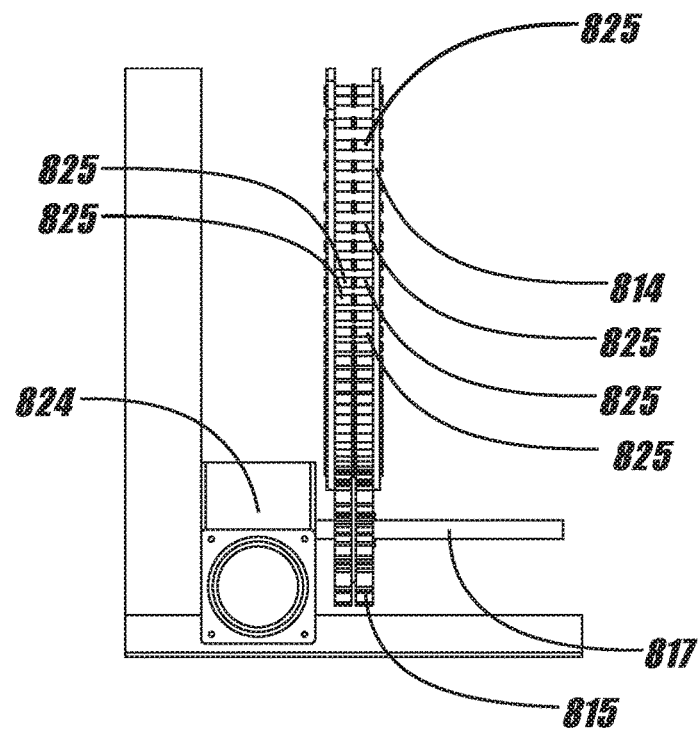
FIG. 18 is side detail view of an exemplary embodiment of a solar tracker gear assembly and exemplary torsion limiter in accordance with the present disclosure.
Figure 19:
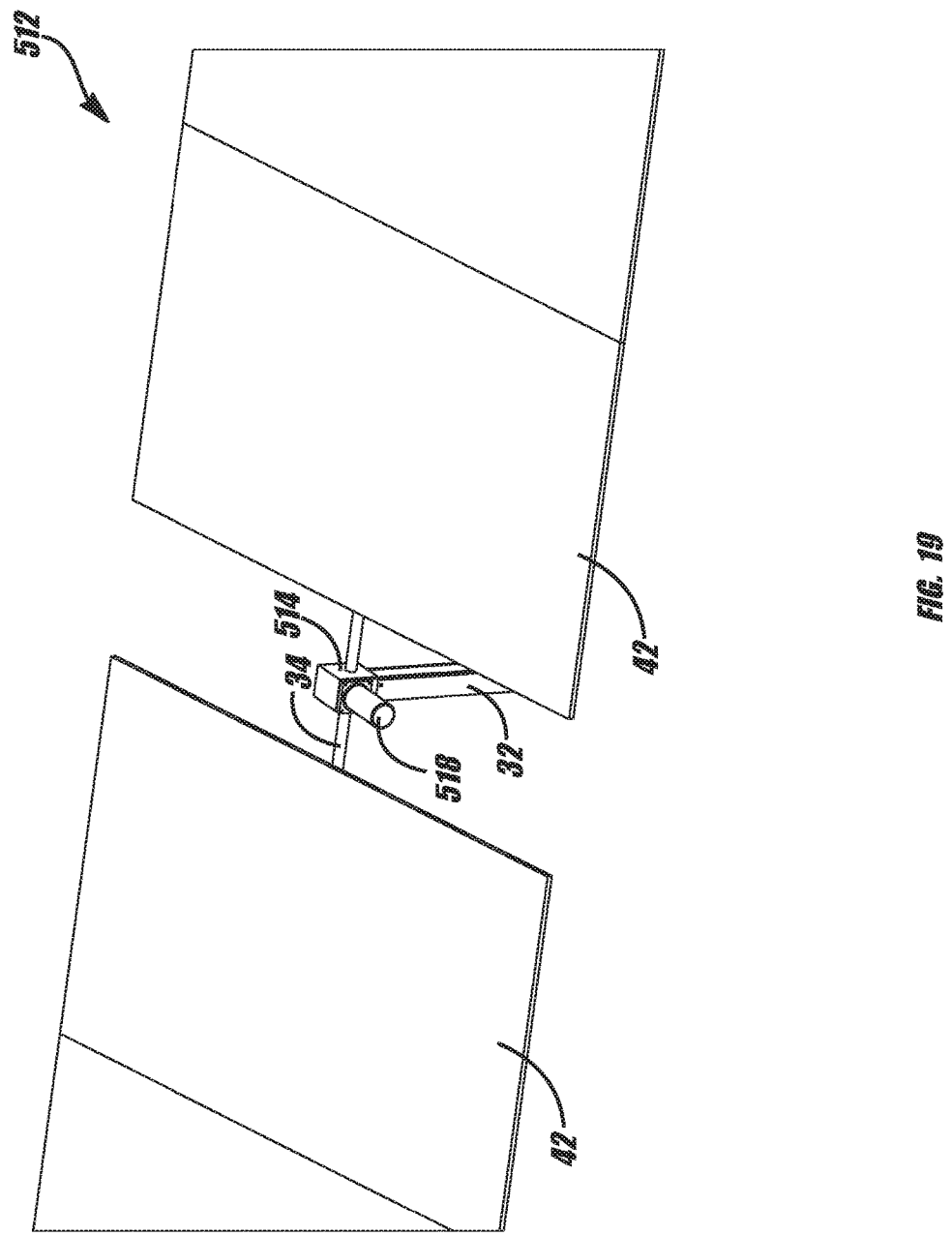
FIG. 19 is a perspective view of an exemplary embodiment of a solar tracker including an exemplary motor brake in accordance with the present disclosure.

FIG. 17 shows a detail view of the end travel position of the gear rack 814 and the engagement of the pinion gear 815. In exemplary embodiments, the pins 825 of the gear rack 814 are advantageously positioned at or near the end of the gear rack 814 to effect a stop as the pinion gear 815 rolls into the changed positioning of the pins 825. As best seen in FIG. 18, the pinion 815 may have center ridged pins 825 and a slotted pinion gear. This arrangement advantageously assures that the pinion gear 815 contacts only the pins 825 of the gear rack 814 and not the side plates of the gear rack.

Figure 20:
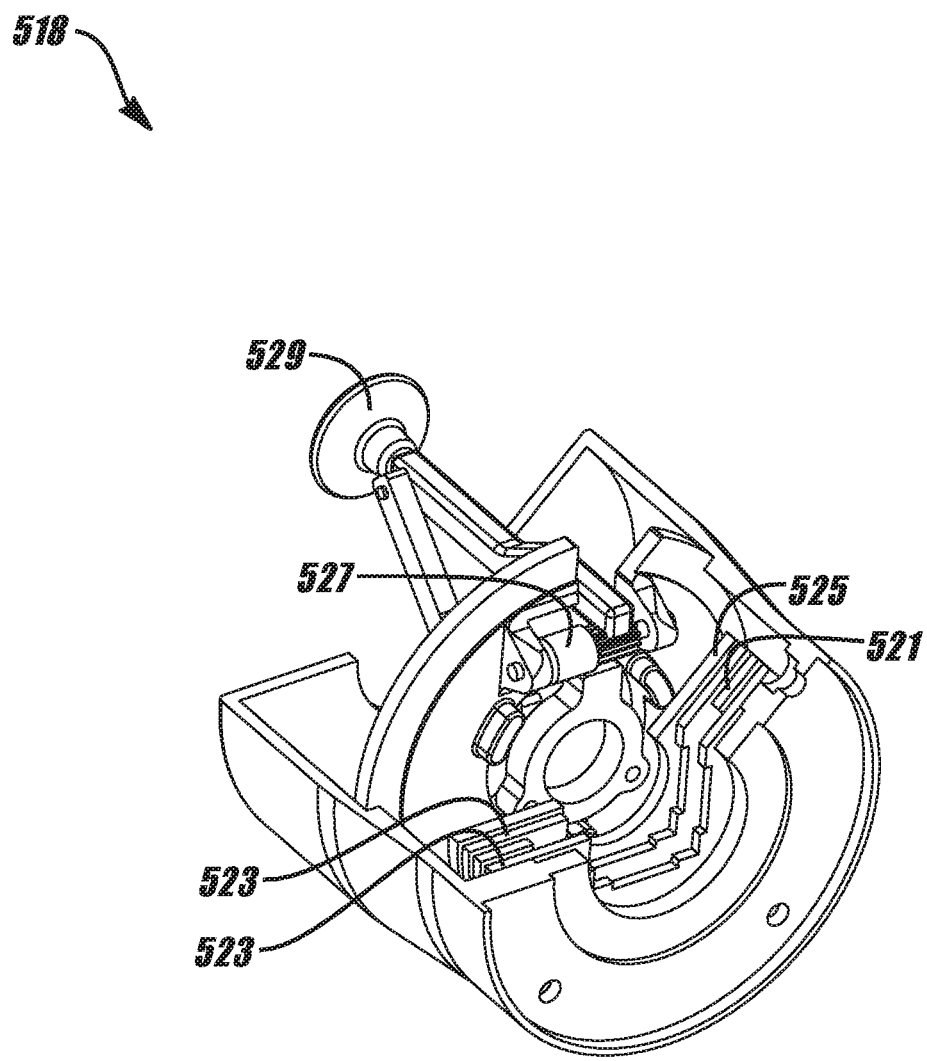
FIG. 20 is a cut-away view of an exemplary embodiment of a motor brake in accordance with the present disclosure.

Turning to FIGS. 19-22, in exemplary embodiments a single motorized solar tracker 512 incorporates a torsion limiter device which could be a motor brake 518. As best seen in FIG. 20, an exemplary motor brake would affix to an electrical motor. The motor brake 518 may include any suitable combination of pressure plate and disc components. In exemplary embodiments, the internal components include a stationary disc 521 as well as one or more rotating friction discs 523 having a hub and shaft. The brake is electrically released during motor operation and engaged when the motor is de-energized. A pressure plate 525 pushes against the discs, and a self-adjusting mechanism 527 may be provided to adjust the pressure on the discs. A release lever 529 allows for manual release of the pressure.

In exemplary embodiments, an individual motor could be located at each array. In exemplary embodiments, a gearing system that is capable of being bi-directionally driven could be coupled to a motor and a motor brake 518 at each array. The motor could have a brake in the motor system or use itself as a brake. With the proper sizing of the motor, the brake, and the gear ratio and gear efficiency, the motor or motor brake 518 may act as the wind force release in the system. In exemplary embodiments, the drive system comprises a bi-directional gearbox 514, and the motor brake 518 is located at the input of the gearbox 514. The bi-directional gearing can be driven from the gearbox input or output and has the capability to be driven from either the output or the input. In exemplary embodiments, the bi-directional gearing could be any suitable gear, including but not limited to a spur gear, helical gear, planetary gear, high efficiency low ratio worm gear, belt drive, chain drive or other bi-directional drive arrangements.

In exemplary motor brake embodiments the torque in the torsion tube 34, as applied by external forces such as wind, is reduced by the gear ratio of the bi-directional gearing, which overcomes the motor brake force. Then the torsion is released at the output and the tracker array rotates. In this embodiment, the motor brake 518 is configured to lock the solar tracker 512 in position until a pre-set torque limit is reached, at which time the motor brake slips. Exemplary embodiments could incorporate a mechanical brake within the motor or affixed between the motor and the gear drive. If the motor itself has a separate brake as in FIG. 21, then the motor may be sized for moving the array separately from the torsion release force required to hold the array.

Figure 21:
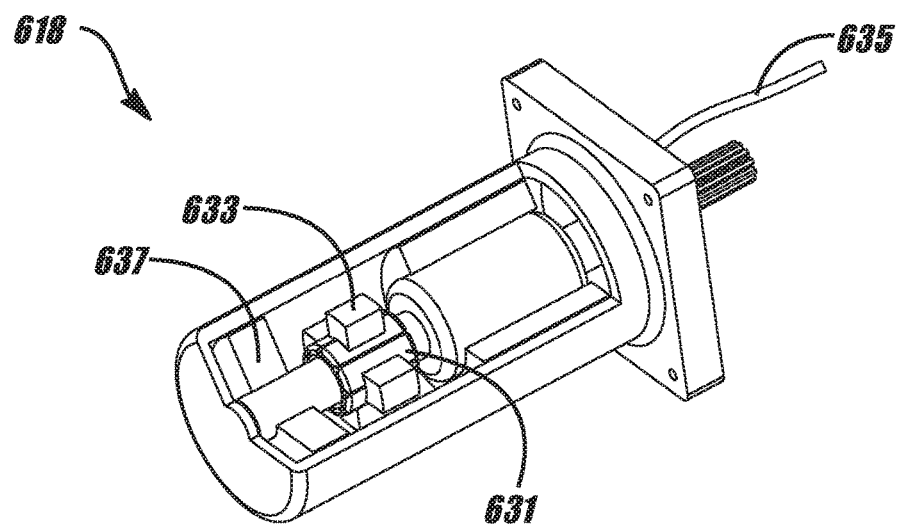
FIG. 21 is a perspective cut-away view of a DC brush motor as used in exemplary embodiments of the present disclosure.

As shown in FIG. 21, the motor brake could be a brush-type direct current motor 618 that has the input power leads, such as lead wire 635, shorted to effect a brake action on the motor output. If designed with a brush-type DC motor and sized properly with the gear ratio and the slip torque, the motor itself may be used as a the slip clutch for the external torsion to overcome. A DC brush-type motor 618 with its power leads shorted together act as a brake by turning the motor into a generator with a shorted output, making the motor difficult to turn. In exemplary embodiments, brush-type motor 618 has an internal commutator 631 to periodically reverse the direction of the current and at least one brush 633 in contact with the commutator to complete the switch.

Figure 22:
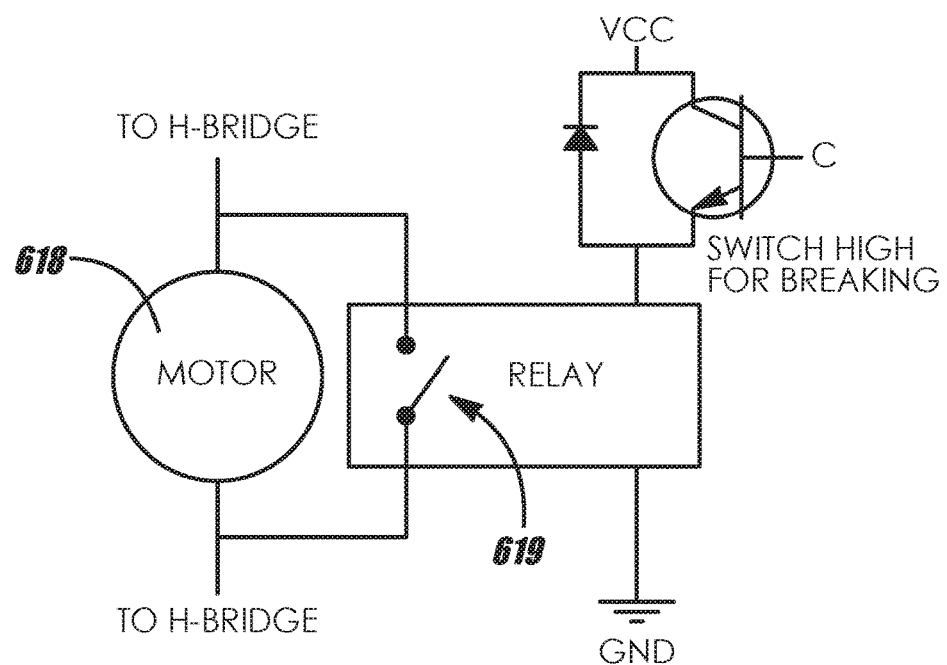
FIG. 22 is a schematic diagram of an exemplary method of shorting out the motor armature of a brush type DC motor to create a motor brake in accordance with the present disclosure.

An exemplary circuit diagram showing incorporation of a motor is illustrated in FIG. 22. FIG. 22 shows an exemplary method of shorting out a motor, in this exemplary embodiment brush motor 618, so it acts as a shorted out generator. The H-Bridge turns on the motor and the motor may be shorted out via relay 619. When this happens, the brush motor 618 acts like a fully-loaded generator so it is hard to turn and acts as a brake on the solar tracking system. The motor 618 may incorporate a brake 637, which could be a negative actuated-type electromagnetic brake. It should be noted that a motor brake could be incorporated in any one of a variety of solar tracker assemblies, including but not limited to an individually motorized single, multi-stage or bi-directional gear driven system. When an external force causes a level of torsion on the drive system to exceed the pre-set limit the motor brake is overcome and facilitates back-driving of the drive system.

Figure 23A:
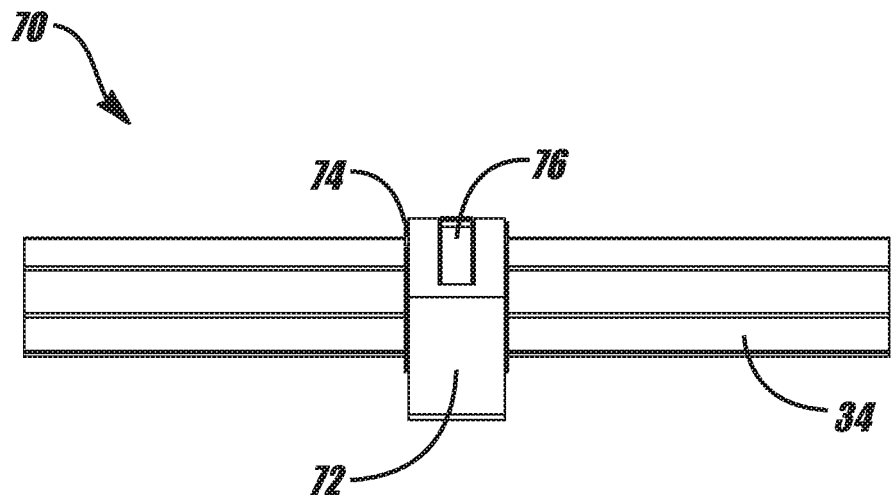
FIG. 23A is a perspective view of an exemplary embodiment of a limit stop in accordance with the present disclosure.
Figure 23B:
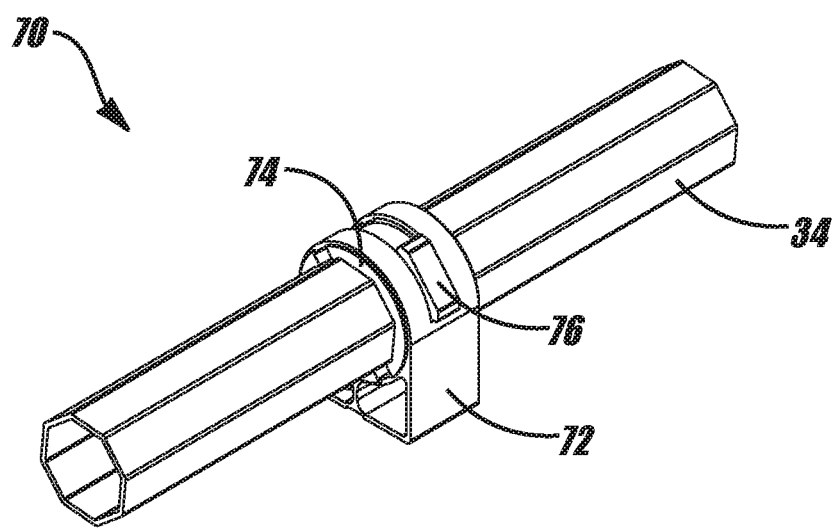
FIG. 23B is a perspective view of an exemplary embodiment of the limit stop of FIG. 23A.
Figure 23C:
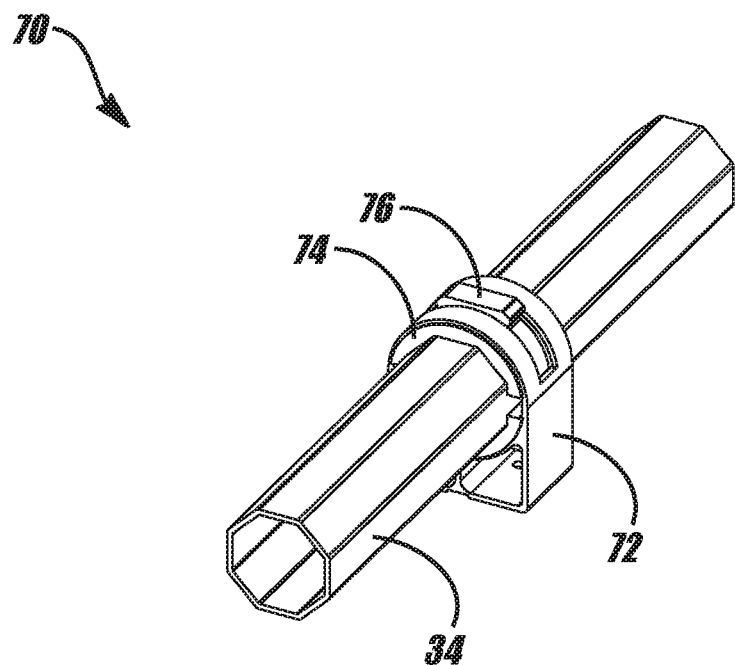
FIG. 23C is a perspective view of the limit stop of FIG. 23A.
Figure 23D:
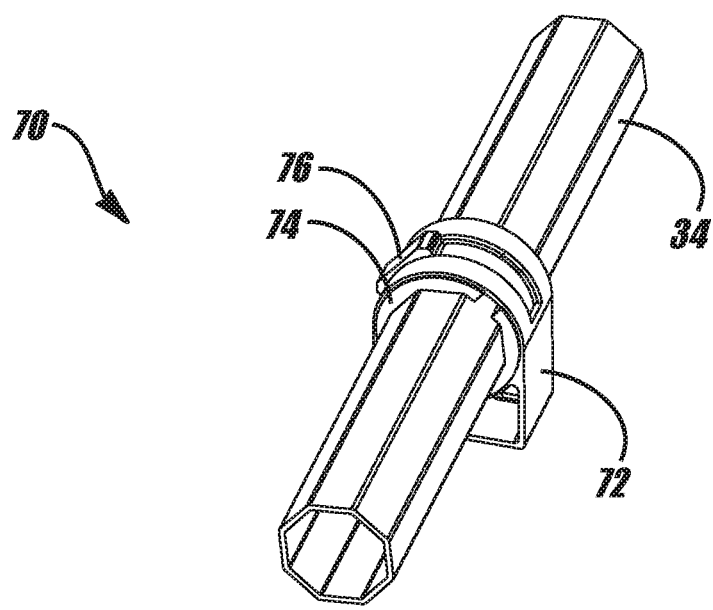
FIG. 23D is a perspective view the limit stop of FIG. 23A at an extreme position.

Turning to FIGS. 23A-23D, an exemplary embodiment of a bearing stop assembly 70 will be described. An exemplary bearing stop assembly 70 comprises a bearing housing 72, a dry slide bearing 74 and an internal rotating stop block 76. FIG. 23B depicts the stop block 76 engaged at one side of its limit of rotation, i.e., one extreme stop position. FIG. 23C shows the stop block 76 in middle position, i.e., in the middle of the allowed rotational motion. FIG. 23D shows the stop block 76 at the opposite extreme stop position of FIG. 23B. The bearing stop assemblies may be placed at every column and may be attached to the torsion tube 34. Bearing stop assemblies 70 advantageously provide the triple function of supporting the solar tracker array, providing a bearing on which the array can rotate, and, as discussed in detail herein, functioning as mechanical stops at the trackers' maximum rotational positions. The housing may be coated with a low friction coating to prevent stick or slip action in the slow moving bearings.

FIGS. 24A-24C illustrate another exemplary embodiment of a tracker bearing stop assembly 170 with integral grounding. An exemplary assembly 170 comprises a bearing housing 172, a pin and roller bearing wheels 173, a dry slide top half bushing 174 and an internal rotating stop block 176. Advantageously, this design may provide better performance in dusty environments and also provides a continuously electrically conductive grounding path, eliminating the need for an external ground wire to electrically bond the torsion tube to the column.

With reference again to FIG. 23A, an exemplary embodiment of a bearing stop assembly 70 can be seen fully mounted in a solar tracker application where the solar tracker 12 has photovoltaic modules 42 mounted to the torsion tube 34 with special module mounting brackets. An additional bracket may be provided which allows a damper to be connected between the torsion tube 34 and the support column 32 of the tracker. A damper may be incorporated at the gear drive to control the rate at which the tracker rotates during an over torque event. When the torsion is relieved by allowing the system to rotate, the speed at which the array is allowed to move may be controlled by the slip friction of the clutch, or by an external damper or both.

In exemplary embodiments, the bearing stop assembly 70 is connected to a U-bracket 78 that connects to an I-beam column 80. As shown, the bearing stop assembly 70 is mounted to an exemplary octagonal torsion tube 34, such that the torsion tube runs through the center of the bearing stop assembly. It should be noted that the torsion tube could be any cross-sectional shape including but not limited to circular, rounded, ovular, square, rectangular, triangular, pentagonal, hexagonal, and octagonal. The stop block 76 in the bearing stop assembly 70 may be configured as a ring which conforms to the outside shape of the torsion tube 34 so that it is keyed to the outside of the tube and rotates with the tube.

In exemplary embodiments, the dry-slide bearing 74 also conforms to the outside shape of the torsion tube 34 and rotates with the tube. As shown in FIG. 23A, the dry slide bearing 74 may be octagonal on the internal and round on the external. The round external shape of the dry-slide bearing 74 slides on the round internal shape of the bearing housing 72. This interface of the external surface of the dry-slide bearing 74 and the internal surface of the bearing housing 72 forms the bearing surface. In exemplary embodiments, the bearing surface of the bearing housing 72 may be coated with a low friction coating to reduce friction in the bearing. The dry-slide bearing 74, is typically formed from polymer material and may also incorporate friction-lowering agents in its composition to reduce friction. When the torsion tube 34 is rotated to the mechanical limits, the stop block 76 engages the bearing housing to eliminate further rotation of the torsion tube 34. There are therefore two extreme rotational stop positions created by the stop block 76.

In operation, the wind induces a hinge moment $M_H$ on the gear-driven mechanical system 10. With reference to FIGS. 1-5 and other illustrative embodiments, the clutch may be pre-set to slip at a fraction of the maximum induced hinge moment torque. When the hinge moment $H_M$ induced by the wind reaches the preset torque limiting value, the friction of the clutch 18 on the tapers 26 is overcome and the clutch 18 slips. In effect, the clutch 18 acts like a pressure relief valve for the hinge moment $M_H$ induced by the wind, advantageously releasing the torque on the gear-driven mechanical unit 12. With the level of torque sufficient to slip the clutch, a row of gear-driven mechanical units 12 may rotate out of position and into a lower hinge moment position.

When the torsion exerted externally on the output of the gear drive system (the collector array) exceeds a pre-set limit, the torsion limiting device allows the array to move into a new position until the force has diminished below the torsion threshold or the array has reached its mechanical limits. In the case where the torsion exerted from the input exceeds the pre-set torsion limit on the array, the torsion limiting device de-couples the excess input force and allows the input to move without affected movement on the array. As discussed in more detail herein, this may be used to synchronize linked arrays when driven against a mechanical stop, or used when natural occurrences such as snow drifts or sand impede array movement. In this case, it is advantageous to de-couple the input driving forces with the torsion limiter and hold the array output at position.

In exemplary embodiments, when wind speed forces exceed the torque required to slip the clutch in the drivetrain, then the solar array or other gear-driven mechanical unit 12 rotates to another position. If this excess torque continues from the wind, then each mechanical unit 12 and the array 50 of units moves to its maximum angle of rotation 54, an extreme rotational angle where the torsion force can be resisted at multiple locations on the torsion tube 34. The row of mechanical units 12 may be rotated by the wind until the maximum angle stop is reached.

In exemplary embodiments, the system may hit mechanical stops 58 on each row of mechanical units 12 each time the row moves to an extreme position during normal operation. Allowing the external force to rotate the row of solar trackers while driving the other rows of solar trackers allows each row to reach its maximum limit position until all of rows of solar trackers are aligned. Advantageously, this ensures alignment of all rows of units 12 twice a day in the event that the wind moves a row. This ensures that all the rows are exactly synchronized at least once per day. At the commissioning of a new project, the tracker rows may be pointing all directions, but after a calibration, the rows would be completely synchronized. It should be noted that in a linked solar tracker system the clutch 18 may act independently at each tracker row. This is because having a back-drivable linked system that has to back drive all tracker rows may not react properly to protect each row when the wind force is applied individually to a row.

In exemplary embodiments, the rotation speed may be regulated by the clutch slip force. Advantageously, the clutch 18 may de-couple the dynamic loads on the system by eliminating the spring in the system, thereby significantly reducing the design loads. Alternatively, dampers 58 may be provided to slow the motion of the tracker. The max angle stop may then be resisted not only by the gear rack, but by the dampers at the gear rack or stops 58 at the end of the rows of mechanical units 12, thereby sharing the torsion load of the gear rack 60 and distributing the torsion load through multiple points on the torsion tube 34. The dampers 58 may serve double duty as stops at the end of the array, or dampers placed at any location may be designed to assist in regulating the torsional release reaction speed and resisting the hinge moment loads.

Advantageously, exemplary embodiments reduce the maximum hinge moment, eliminate the dynamic loading, and allow gear-driven mechanical systems to resist the hinge moment forces at multiple points on the array instead of at a single point. It is typical that the hinge moment forces are greater at small tilt angles and reduce as the array tilt angles increase. In exemplary embodiments, at the extreme vertical stop positions, the maximum hinge moment force will be less than at the small angles of rotation and will only occur at the mechanical stops at the range of motion extremes. The total hinge moment may be resisted in more than just the central gear. Range of motion mechanical stops may be placed at any location on the array, typically at the distributed vertical supports, to assist in resisting the hinge moment loading, thereby minimizing torsion loads at any single point in the system.

Referring again to FIGS. 1 and 3, the maximum hinge moment may be x ft lbs, and the clutch 18 slips at about x/4 ft lbs. Accordingly, the torsion tube 34 need only resist a maximum of x/4 ft lbs at the gear drive 16 prior to the clutch 18 slipping. In this exemplary embodiment, at the maximum angle of rotation 54 the maximum hinge moment is about x ft lbs, the gear resists x/2 ft lbs and the stops located at the ends of the tracker must resist x/4 ft lbs so the maximum torsion load in the tube 34 is x/4 ft lbs. The maximum torsion values would likely be double in each component without advantageous use of exemplary embodiments of the clutch and multiple stops. These values can be reduced further by allowing the torsion release to occur at lower values and using more stops than only at the ends of the array, such as at every column.

In exemplary embodiments, the driveline and the gear rack would not see one gear rack 14 stopping the force from the motor 15. Accordingly, the gear rack and the driveline can be more minimally constructed. Moreover, exemplary systems would need only be constructed to see the motion restricted to the everyday range of motion and over travel protection could be incorporated into the torsion limiter. The dampers 58 and gear rack 14 may be optimally designed and implemented at full range of motion. No extra tolerance on range of motion is necessary other than the daily range of motion.

Advantageously, in exemplary embodiments if one row of mechanical units 12 has a mechanical bind, it will not affect the rest of the system 10. This may be helpful as it may self-diagnose a tracker row binding problem. If the outer rows move to an extreme angle from the wind, they may act as wind blockers to the inner rows. Because the forces of lift, drag and hinge moment occur in combination on the system and each of these loads may peak at different specific rotational angle positions, it may be advantageous to allow a row of mechanical units to move into a more extreme angle position prior to the maximum lift force condition occurring. If this is reliably accomplished via the torsion limiters discussed herein, then the foundation design value for maximum lift will be lower and therefore the size and/or depth required for the system foundation may be lessened to resist the lower lift force.

The torsional strength requirements may be less because the maximum torsion can be resisted at multiple points and not at the maximum rotational angle for peak hinge moment. The drag force peak may not change since the system typically is designed for the extreme rotational angle position in the case of horizontal solar trackers, but may be lessened in other solar tracker geometries. The maximum combined force may also be less, in which case the overall structural requirements will be lessened. These force reductions equate to reductions in the structural requirements of the mechanical systems. A reduction in structural material typically equates to a substantial material cost savings and may also equate to labor savings, therefore the overall installed cost of the system may be reduced.

Thus, it is seen that torsion limiter devices, systems, and methods incorporated into systems such as solar trackers are provided. While the systems, devices, and methods have been described in terms of exemplary embodiments, it is to be understood that the disclosure need not be limited to the disclosed embodiments. Although illustrative embodiments are described hereinabove, it will be evident to one skilled in the art that various changes and modifications may be made therein without departing from the disclosure.

It should be understood that any of the foregoing configurations and specialized components or chemical compounds may be interchangeably used with any of the systems of the preceding embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims. It is intended in the appended claims to cover all such changes and modifications that fall within the true spirit and scope of the disclosure.

What is claimed is:

1. A solar tracker assembly comprising:
   a support column;
   one or more torque tubes or torsion beams connected to the support column;
   a mounting mechanism attached to the one or more torque tubes or torsion beams;
   a drive system connected to the one or more torque tubes or torsion beams; and
   a torque limiter connected to an output of the drive system of a tracker row;
   wherein when a hinge moment force causes a level of torque on the drive system to exceed a pre-set limit the torque limiter passively allows rotational movement of the tracker row in the direction of the torque, thereby allowing the hinge moment force to rotate the tracker row about a pivot axis such that hinge moment is reduced or eliminated as a result of a new rotational position of the tracker row independently of a plurality of tracker rows.

2. The solar tracker assembly of claim 1 wherein the movement in the direction of the torque de-couples excess torque such that the hinge moment force is released and the level of torsion on the solar tracker assembly is reduced.

3. The solar tracker assembly of claim 2 wherein the movement in the direction of the torque comprises movement of the solar tracker assembly from a first rotational position to at least one second rotational position.

4. The solar tracker assembly of claim 3 further comprising one or more mechanical stops connected to the support column, the mechanical stops being located at the solar tracker's maximum rotational position;
wherein the solar tracker assembly hits a maximum position stop in the at least one second rotational position.

5. The solar tracker assembly of claim 3 wherein the solar tracker assembly is constrained in its maximum rotational positions at multiple distributed locations along the solar tracker assembly.

6. The solar tracker assembly of claim 1 wherein the solar tracker assembly includes a plurality of support columns supporting a tracker row and further comprises a stop at each support column.

7. The solar tracker assembly of claim 6 wherein the stops distribute the torque force resistance within the tracker row when the tracker row reaches its maximum rotational position.

8. The solar tracker assembly of claim 1 wherein the drive system comprises a gear assembly including at least one gear.

9. The solar tracker assembly of claim 8 wherein the gear assembly includes a one-way gearbox and the torque limiter is a torque limiting clutch contained within the gearbox.

10. The solar tracker assembly of claim 8 wherein the gear assembly includes a friction coupling engaging the gear wheel and the torque limiter is located at the friction coupling.

11. The solar tracker assembly of claim 8 wherein the torque limiter is located at the output of a first gear stage of the gear assembly.

12. The solar tracker assembly of claim 1 wherein the solar tracker assembly is a push/pull linked tracker and the torque limiter is a linear slip device.

13. The solar tracker assembly of claim 1 wherein the solar tracker assembly includes a hydraulic system and the torque limiter is a pressure relief valve.

14. The solar tracker assembly of claim 1 further comprising a damper to control release of torque force and slow motion of the solar tracker assembly.

15. The solar tracker assembly of claim 1 wherein the one or more torque tubes or torsion beams are configured with a balanced center of gravity such that one or more of the torque tubes or torsion beams rotate about the balanced center of gravity.

16. A method of aligning a solar array, comprising:
providing a plurality of rows of solar trackers including multiple rows of linked solar trackers;
providing a torque limiter connected to each tracker row;
receiving a hinge moment force on at least one tracker row such that a level of torque on the at least one tracker row exceeds a pre-set torque limit;
passively allowing rotational movement of the at least one tracker row;
causing the at least one tracker row to stop rotational movement independent of the multiple rows of solar trackers when the at least one tracker row moves from a first rotational position to a second rotational position; and
the motor driving other tracker rows while slipping the torque limiter on each tracker row at the maximum rotational limit of each tracker row such that each tracker row reaches its maximum rotational limit until all of the plurality of rows of solar trackers are aligned.

17. The method of claim 16 wherein each tracker row includes a plurality of support columns and further comprising providing a stop at each support column.

18. The method of claim 17 wherein when each tracker row reaches its maximum rotational limit position the torque is distributed between each stop at each support column.

19. A solar tracker assembly comprising:
a support column;
one or more torque tubes or torsion beams connected to the support column;
a mounting mechanism attached to the one or more torque tubes or torsion beams;
a drive system connected to the one or more torque tubes or torsion beams; and
a torque limiter connected to the drive system; and
one or more stops connected to the support column, the stops being located at the solar tracker's maximum rotational position;
wherein when a hinge moment force causes a level of torque on the drive system to exceed a pre-set limit the torque limiter allows rotational movement of the solar tracker assembly, thereby allowing the hinge moment force to rotate the solar tracker assembly into a lower hinge moment position; and
wherein the solar tracker assembly hits a maximum position stop and is constrained in its maximum rotational positions at multiple distributed locations by the stops.

20. The solar tracker assembly of claim 19 wherein the torque limiter is a motor brake.

21. The solar tracker assembly of claim 20 wherein the motor brake is affixed to a motor and connected to a bi-directional gearing system.

22. The solar tracker assembly of claim 21 wherein when a hinge moment force causes a level of torque on the drive system to exceed a pre-set limit, the motor brake slips.

23. The solar tracker assembly of claim 21 wherein the motor brake is internal to the motor; and
wherein when a hinge moment force causes a level of torque on the drive system to exceed a pre-set limit the motor brake is overcome and the motor is driven backwards, facilitating back-driving of the drive system.

24. The solar tracker assembly of claim 21 wherein the motor is an electric motor comprising power leads and the motor brake electrically brakes the motor by shorting the power leads.

25. The solar tracker assembly of claim 21 wherein the bi-directional gearing system comprises at least one gear element of a back-driveable worm gear.

26. The solar tracker assembly of claim 19 wherein the hinge moment force is caused by an external obstruction.

27. The solar tracker assembly of claim 26 wherein the solar tracker assembly is incorporated into multiple tracker rows having a linked drive system; and
wherein tracker rows affected by the external obstruction stop moving and tracker rows not affected by the external obstruction continue to track.

* * * * *